(12) United States Patent
Ishihara

(10) Patent No.: US 9,025,935 B2
(45) Date of Patent: May 5, 2015

(54) RECORDING APPARATUS, RECORDING METHOD, AND RECORDING SYSTEM

(71) Applicant: Canon Kabushiki Kaisha, Tokyo (JP)

(72) Inventor: Akihito Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 13/750,380

(22) Filed: Jan. 25, 2013

(65) Prior Publication Data
US 2013/0202271 A1 Aug. 8, 2013

(30) Foreign Application Priority Data
Feb. 8, 2012 (JP) ................................. 2012-025372

(51) Int. Cl.
*H04N 5/91* (2006.01)
*H04N 5/77* (2006.01)
*H04N 9/82* (2006.01)
*G11B 27/034* (2006.01)
*H04N 5/765* (2006.01)

(52) U.S. Cl.
CPC .................. *H04N 5/91* (2013.01); *H04N 5/765* (2013.01); *H04N 5/772* (2013.01); *H04N 9/8205* (2013.01); *G11B 27/034* (2013.01)

(58) Field of Classification Search
CPC .... G11B 27/034; G11B 27/031; G11B 27/02; G11B 27/00; H04N 5/91; H04N 5/772; H04N 5/765; H04N 9/8205; H04N 9/82
USPC ................................................. 386/278–290
See application file for complete search history.

(56) References Cited

U.S. PATENT DOCUMENTS

| RE40,044 E * | 2/2008 | Kanota et al. ................. 386/353 |
| 2004/0062518 A1 * | 4/2004 | McNeal et al. ................. 386/46 |
| 2006/0215983 A1 * | 9/2006 | Takeuchi ......................... 386/46 |
| 2009/0028530 A1 * | 1/2009 | Yamada et al. ............... 386/124 |

FOREIGN PATENT DOCUMENTS

JP  2003-061041  2/2003

\* cited by examiner

*Primary Examiner* — Thai Tran
*Assistant Examiner* — Stephen Smith
(74) *Attorney, Agent, or Firm* — Cowan, Liebowitz & Latman, P.C.

(57) ABSTRACT

A moving image recording apparatus generates first moving image data and second moving image data having less number of pixels than that of the first moving image data, records a moving image file including generated moving image data into a recording medium, and in the case that the first moving image data is outputted to the external apparatus for recording the first moving image data, controls so as to generate the second moving image data concurrently with the outputting of the first moving image data and controls to record a moving image file including the generated second moving image data into the recording medium, wherein outputting an instruction for closing a moving image file including the first moving image data to the external apparatus is controlled in accordance with the moving image file including the second moving image data being recorded into the recording medium having been closed.

13 Claims, 18 Drawing Sheets

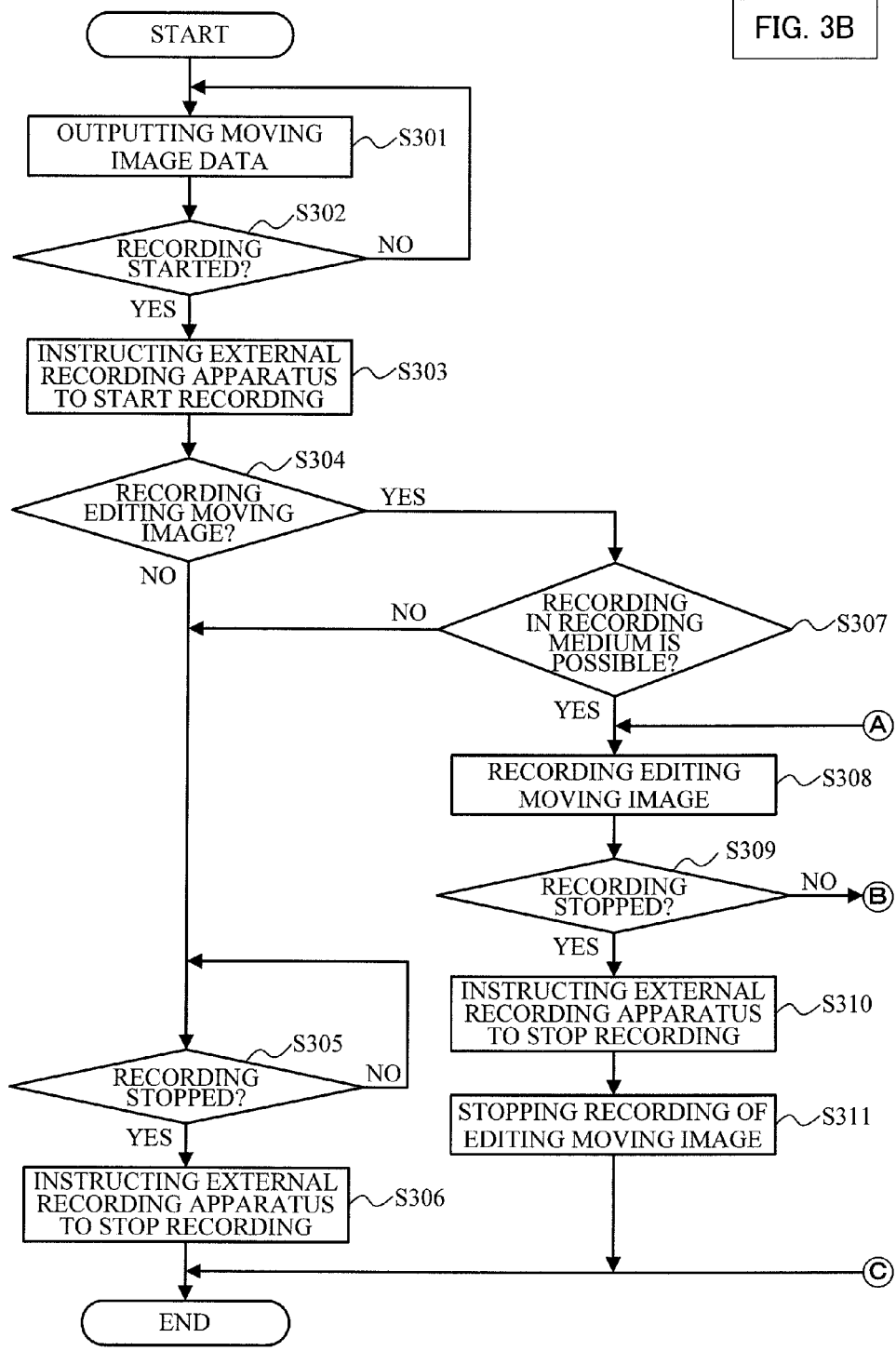

| SD-SDI | HD-SDI | Dual Link SDI | 3G SDI |
|---|---|---|---|
| 270Mbps ONE COAXIAL CABLE | 1.485Gbps ONE COAXIAL CABLE | 2.970Gbps TWO COAXIAL CABLES | 2.970Gbps ONE COAXIAL CABLE |

FIG. 7

| OUTPUT SIGNAL | FRAME RATE | NUMBER OF CHANNELS | | | |
|---|---|---|---|---|---|
| | | SD-SDI | HD-SDI | Dual Link SDI | 3G SDI |
| 4K (4096×2160) | 59.94P | UNUSABLE | UNUSABLE | 4 | 2 |
| | 50.00P | | | | |
| | 29.97P | | | 2 | 1 |
| | 25.00P | | | | |
| | 24.00P | | | | |
| | 23.98P | | | | |
| HD (1920×1080) | 59.94P | UNUSABLE | 1 | 1 | 1 |
| | 50.00P | | | | |
| | 29.97P | | | | |
| | 25.00P | | 1 | 1 | 1 |
| | 24.00P | | | | |
| | 23.98P | | | | |
| SD (720×480) | 59.94P | 1 | | | |
| | 50.00P | | | | |
| | 29.97P | | | | |
| | 25.00P | | | | |
| | 24.00P | | | | |
| | 23.98P | | | | |

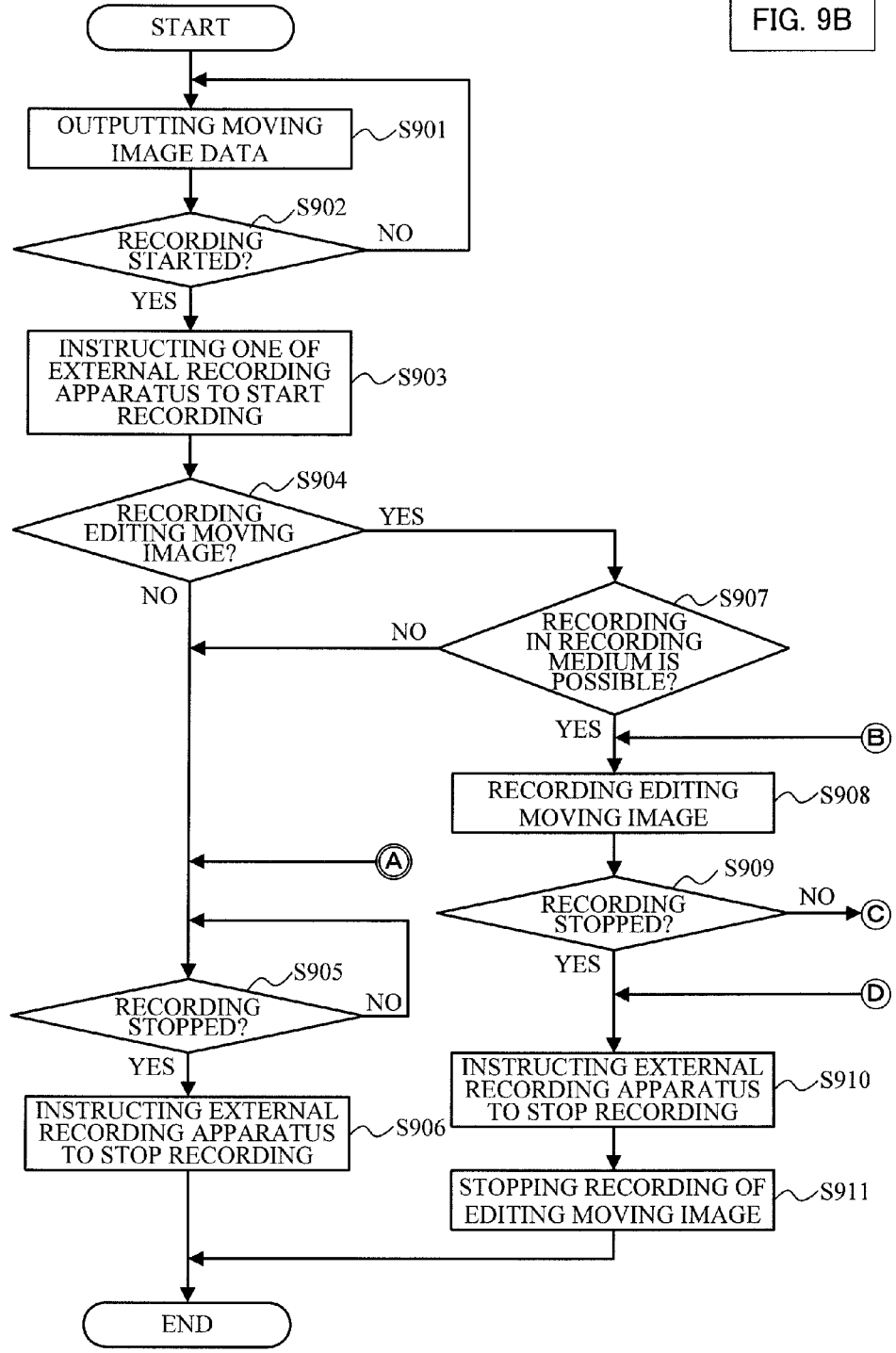

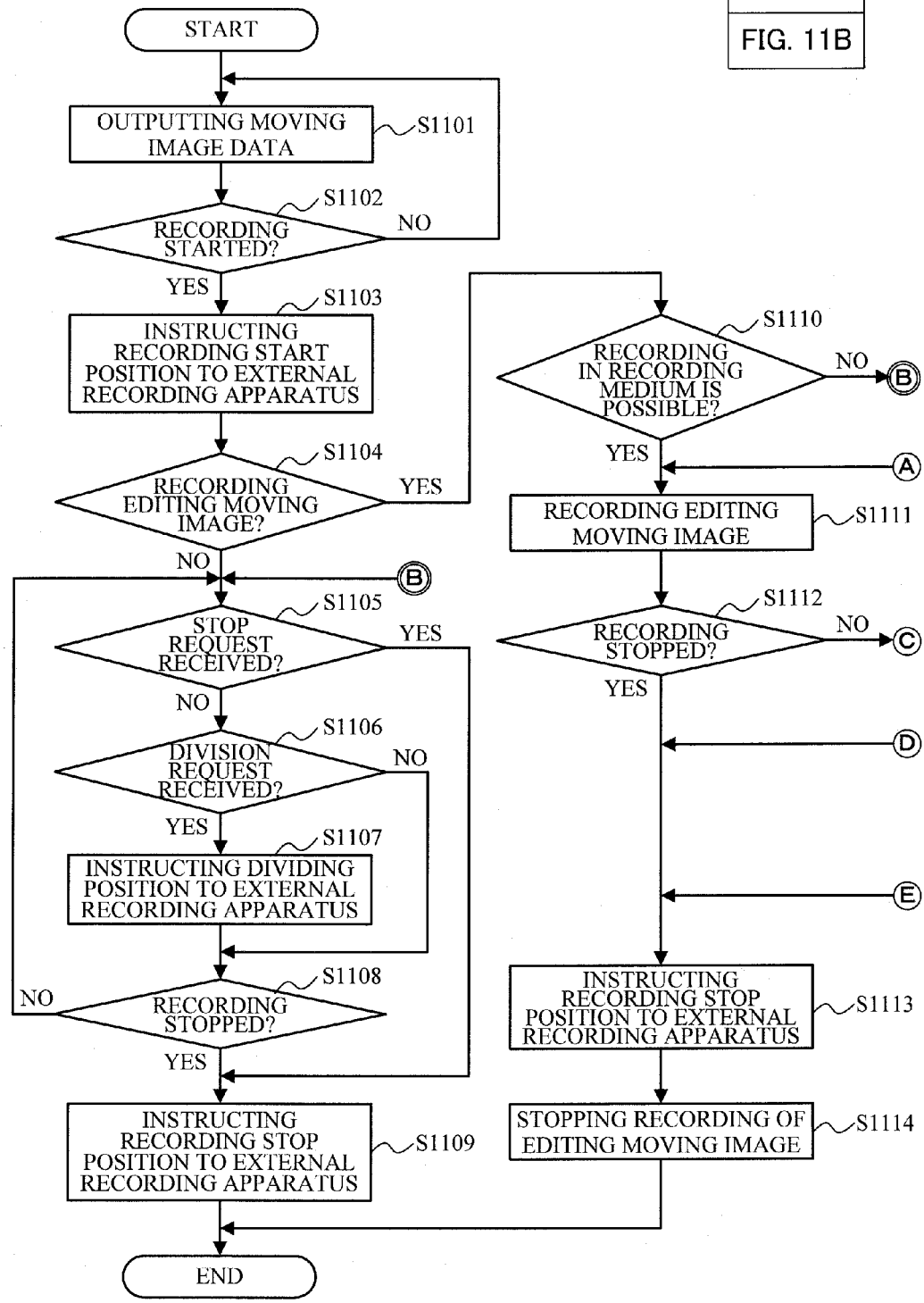

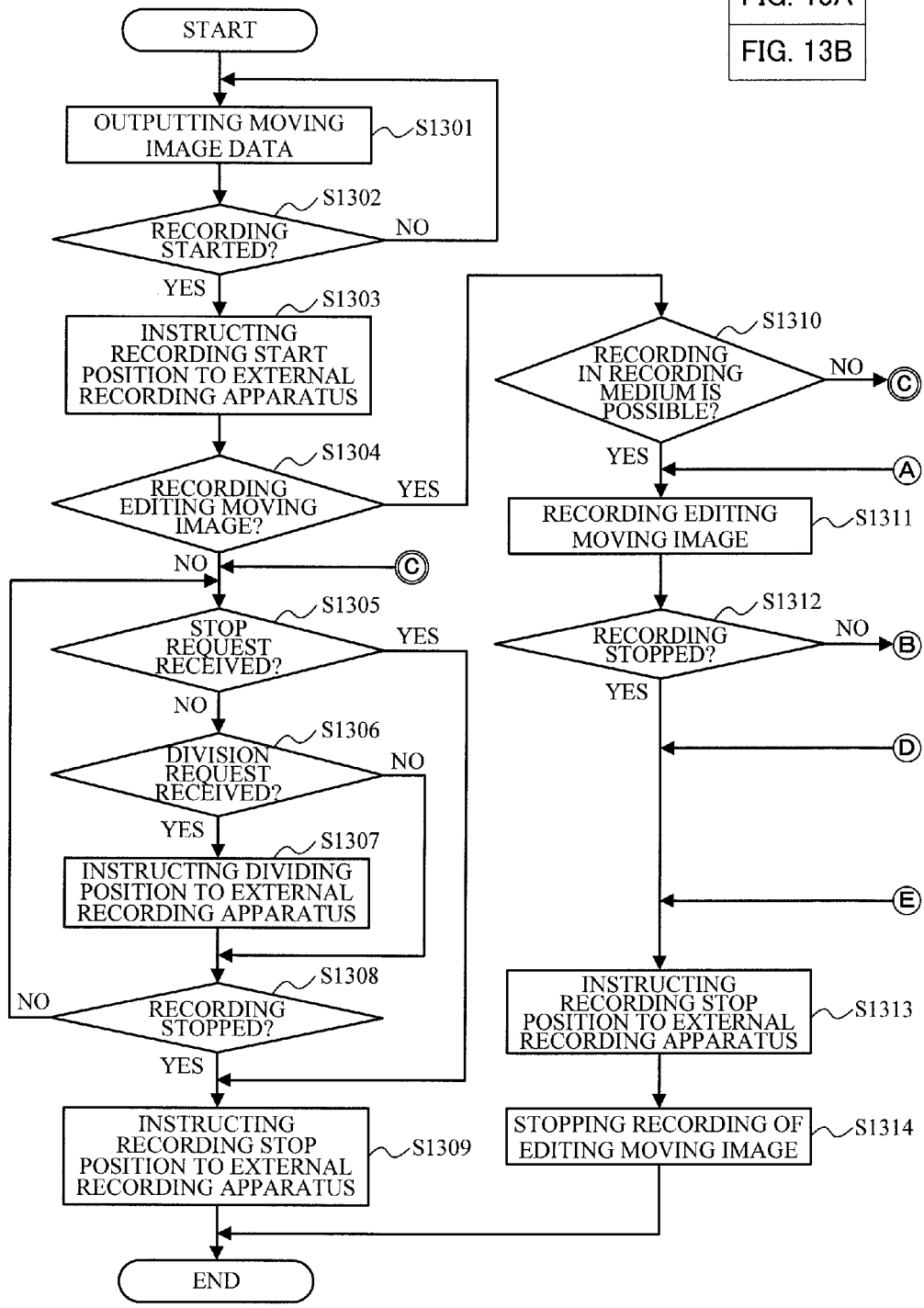

RECORDING APPARATUS, RECORDING METHOD, AND RECORDING SYSTEM

BACKGROUND OF THE INVENTION

1. Field of the Invention

The present invention relates to a recording apparatus of moving image data and, more particularly, to a recording apparatus, a recording method, and a recording system for recording moving image data and moving image data for editing that moving image data (hereinafter, referred to as "editing moving image data").

2. Description of the Related Art

In the conventional arts, in the case of performing editing such as division, combination, and the like of a moving image, a moving image for editing whose picture screen size is smaller than that of moving image data to be subjected to editing is prepared, an editing point is determined by using the editing moving image, and thereafter, the editing subject moving image is edited on the basis of the editing point (for example, refer to the Official Gazette of Japanese Patent Application Laid-Open No. 2003-61041). The editing moving image is also called a "proxy".

In the case of generating the proxy, the original editing subject moving image is temporarily decoded and is subjected to a processing such as a reduction of the picture screen size or the like and, thereafter, a compression and encoding processing is executed again. Therefore, it takes many hours to generate the proxy.

Further, although there is also considered a method whereby the moving image is simultaneously recorded onto a plurality of recording mediums and each recording medium is edited by an individual editing system, even in such a case, it is still necessary to generate the proxy in each editing system and a long time and much troublesomeness are also required.

SUMMARY OF THE INVENTION

It is an aspect of the invention to solve such a problem and to enable an editing moving image to be promptly and efficiently generated and recorded.

According to the aspect of the invention, a recording apparatus of moving image data generates first moving image data and second moving image data having less number of pixels than that of the first moving image data by using moving image data, records a moving image file including generated moving image data into a recording medium, and in the case that the first moving image data is outputted to the external apparatus for recording the first moving image data, controls so as to generate the second moving image data concurrently with the outputting of the first moving image data and controls to record a moving image file including the generated second moving image data into the recording medium, wherein outputting an instruction for closing a moving image file including the first moving image data to the external apparatus is controlled in accordance with the moving image file including the second moving image data which is being recorded into the recording medium having been closed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a diagram illustrating relations among moving image data which is output from the recording apparatus according to the first embodiment of the invention, an SDI format, and the number of output channels.

DESCRIPTION OF THE EMBODIMENTS

Exemplary embodiments of the invention will be described hereinbelow with reference to the drawings.

The embodiments are embodiments in the case where the invention is applied to a recording system at the time when photographed moving image data is recorded into an external recording apparatus. The recording system can have a construction as illustrated in FIGS. 6A to 6E.

First Embodiment

Figure 1:
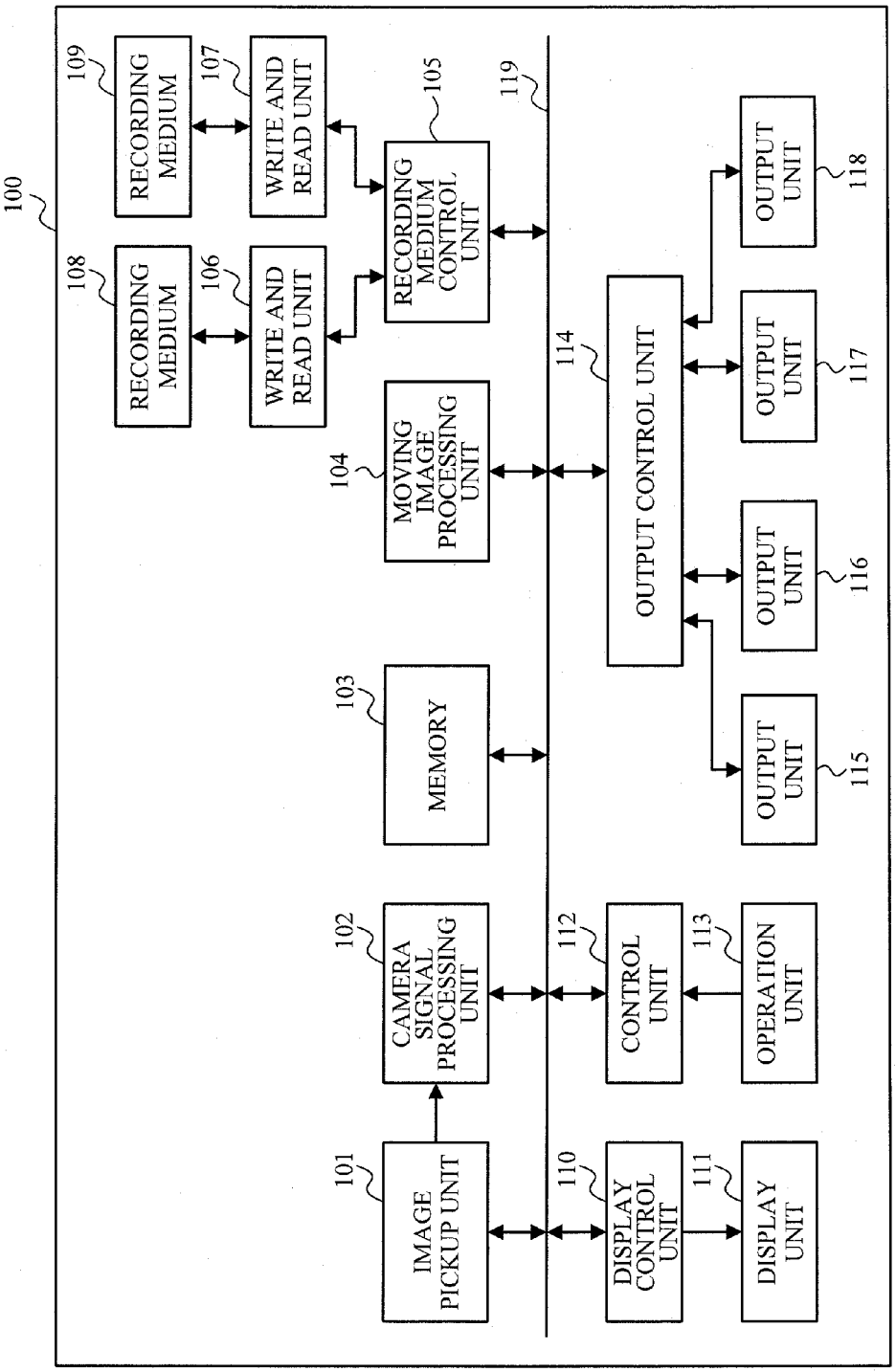
FIG. 1 is a block diagram illustrating a construction of an image pickup apparatus in the case where a recording apparatus according to the first embodiment of the invention is applied to the image pickup apparatus.

FIG. 1 is a block diagram illustrating an example of a construction of a recording apparatus 100 according to the embodiment. The recording apparatus can input and record moving image data from the outside as well as moving image data from an image pickup unit or a camera signal processing unit. Further, the recording apparatus is constructed in such a manner that the number of pixels of a moving image which is input and a frame rate can be also properly set.

In FIG. 1, an image pickup unit 101 has: an optical system such as lens, iris, shutter, and the like (not shown); and an image pickup element such as CCD, CMOS, or the like. The image pickup unit 101 photographs an object by them and outputs moving image data. The image pickup unit 101 obtains the moving image data and audio data to output them. In the embodiment, one picture plane of the image pickup element of the image pickup unit 101 is constructed by 4096 pixels (in the lateral direction)×2160 pixels (in the vertical direction) and the image pickup element can output a moving image of 60 frames per second. A camera signal processing unit 102 executes necessary processings to the moving image data from the image pickup unit 101. A memory 103 stores the moving image data and other data. Each block of the recording apparatus 100 accesses the memory 103, thereby executing the necessary processings. Besides the moving image data, the memory 103 stores various kinds of information such as information of a file system, management information such as user setting, and the like, and further plays a role of a work memory or the like for control by a control unit 112. The memory 103 also plays a role of a buffer memory upon recording or reproduction of data.

A moving image processing unit 104 converts the number of pixels of the moving image data which is input. Upon recording, the moving image processing unit 104 encodes the moving image data to be recorded by a well-known encoding method such as MPEG or the like and compresses an amount of information. As will be described hereinafter, in the case of outputting the moving image data to an external recording apparatus, the moving image processing unit 104 converts the moving image data in accordance with an output form which is set by the user. Upon reproduction, the moving image processing unit 104 decodes the reproduced moving image data.

A recording medium control unit 105 outputs a write instruction and a read instruction of data to write and read units 106 and 107, respectively. The recording medium control unit 105 outputs data to be recorded to the write and read units 106 and 107 and receives reproduced data from the write and read units 106 and 107. The recording medium control unit 105 manages a result of detecting whether or not recording mediums 108 and 109 are loaded, and recording information such as remaining amount of a recording capacity (remaining recording capacity) of each recording medium, information of a file size of the moving image data which is being recorded, and the like, by means of the write and read units 106 and 107.

The write and read units 106 and 107 write or read out the moving image data and various kinds of information into/from the recording mediums 108 and 109 and manage the recording mediums. For example, the information regarding the detection of loading of the recording medium, the remaining recording capacity of the loaded recording medium, the file size of the recorded data, and the like is obtained. Those information is evaluated by the control unit 112 during the recording operation in order to control the recording of the moving image data. Upon recording, the write and read units 106 and 107 record the moving image data into the recording mediums 108 and 109. Upon reproduction, the write and read units 106 and 107 read out the moving image data from the recording mediums 108 and 109 and send to the recording medium control unit 105. In the embodiment, the recording mediums 108 and 109 are constructed as independently separate recording mediums and are random access recording mediums such as hard disks (HDD), flash memory cards, or the like.

The recording medium control unit 105 manages the moving image data and the various kinds of information, as a file, which are recorded into the recording mediums 108 and 109 in accordance with a file system such as an FAT (File Allocation Table) or the like. The recording medium control unit 105 has a well-known interface (IF) such as an ATA (AT Attachment) or the like and communicates data and various kinds of commands with a recording medium IF in the control unit 112. The recording mediums 108 and 109 can be easily loaded and unloaded into/from the recording apparatus 100 by a loading and unloading mechanism (not shown). Both or one of the recording mediums 108 and 109 may be built in the recording apparatus 100. A display control unit 110 displays an image and other information to a display unit 111, for example, displays user setting information, information regarding the recording medium, information regarding the data which is being recorded, and the like. The display unit 111 includes a liquid crystal display apparatus, an organic EL apparatus, or the like.

The control unit 112 controls the whole operation of the recording apparatus 100 in accordance with an input from an operation unit 113. The control unit 112 includes a microcomputer (CPU), a memory, and the like and controls the recording apparatus 100 in accordance with a program (software) stored in a memory (not shown). The control unit 112 has therein a recording medium interface for communicating data and commands with the recording medium control unit 105. The operation unit 113 includes various kinds of switches which can be operated by the user, receives various kinds of instructions made by the user, and notifies the control unit 112 of them. The operation unit 113 also includes a power switch, switches for instructing the start and stop of the recording, a switch for switching operation modes such as a recording mode and the like of the recording apparatus 100, and the like.

In the case of writing and reading out a moving image file into/from the recording mediums 108 and 109, the control unit 112 controls the recording medium control unit 105 so as to read out file system data (management data) from the recording mediums 108 and 109 and store into the memory 103. The file system data is data showing file names of the data recorded in the recording mediums 108 and 109, sizes of the files, recording addresses of the data, and the like and is management information to manage the files. The control unit 112 controls writing and reading of the files in accordance with the read-out file system data. In accordance with the writing of the files into the recording mediums 108 and 109, the control unit 112 updates the file system data stored in the memory 103. The updated file system data is recorded into the recording mediums 108 and 109 by the recording medium control unit 105.

An output control unit 114 outputs the moving image data to the external recording apparatus by using output units 115 to 118 as a plurality of output channels (channels). The output control unit 114 converts the moving image data into a format suitable for a predetermined format and outputs to the output units 115 to 118. In the embodiment, the output units 115 to 118 output the moving image data in the format which conforms with the SDI (Serial Digital Interface) standard specified in SMPTE (the Society of Motion Picture and Television Engineers). Therefore, the output control unit 114 converts the moving image data into the moving image data in the format suitable for the SDI format and outputs. The output units 115 to 118 output the moving image data received from the output control unit 114, respectively. Each of the output units 115 to 118 has a connecting portion such as a BNC (Bayonet Neill Concelman) connector or the like. A data bus 119 is a transmission path for transmitting and receiving the data to/from each unit.

Subsequently, a recording processing in a normal mode in the recording apparatus 100 will be described. In the embodiment, as the number of pixels of one frame of the moving image data to be recorded, the user can select one of the following three kinds of numbers of pixels: 4096 pixels (in the lateral direction)×2160 pixels (in the vertical direction); 1920 pixels (in the lateral direction)×1080 pixels (in the vertical direction); and 720 pixels (in the lateral direction)×480 pixels (in the vertical direction). In the embodiment, the moving image in which the number of pixels of one frame is equal to 4096 pixels (in the lateral direction)×2160 pixels (in the vertical direction) is called 4K; the moving image of 1920 pixels (in the lateral direction)×1080 pixels (in the vertical direction) is called HD; and the moving image of 720 pixels (in the lateral direction)×480 pixels (in the vertical direction) is called SD. As a frame rate (the number of frames per unit time) of the moving image data to be recorded, the user can set one of 59.94 frames/sec (fps), fps, 29.97 fps, 25 fps, 24 fps, and 23.98 fps. By operating the operation unit 113, the user selects the number of pixels of the moving image to be recorded and the frame rate. The number of pixels of the moving image data and the frame rate may be also set to other values.

When a power source is turned on by the operation unit 113, the control unit 112 controls each unit, displays the moving image photographed by the image pickup unit 101 to the display unit 111, and sets the recording apparatus 100 into a recording standby state. When there is a recording start instruction from the operation unit 113 in this recording standby state, the control unit 112 instructs the image pickup unit 101 and the camera signal processing unit 102 so as to output the moving image data of the designated frame rate. The camera signal processing unit 102 outputs the moving image data of 4K of the designated frame rate and stores into the memory 103. The moving image processing unit 104 reads out the moving image data of 4K stored in the memory 103 and converts the number of pixels of the moving image data into the number of pixels designated by the user. The moving image processing unit 104 encodes the converted moving image data and stores into the memory 103.

The control unit 112 instructs the recording medium control unit 105 so as to start the recording of the moving image. The recording medium control unit 105 reads out the moving image data from the memory 103 and outputs to one of the write and read units 106 and 107 so as to be recorded into one of the recording mediums 108 and 109. In the embodiment, by operating the operation unit 113, the user selects one of the recording mediums 108 and 109 and the moving image data is recorded into the selected recording medium. If only one of the recording mediums 108 and 109 is loaded, the control unit 112 instructs the recording medium control unit 105 so as to record the moving image data into the loaded recording medium irrespective of the setting by the user.

In accordance with an instruction from the control unit 112, the recording medium control unit 105 outputs the moving image data which is read out of the memory 103 to one of the write and read units 106 and 107 and instructs so as to write it. One of the instructed write and read units 106 and 107 records the received moving image data into one of the recording mediums 108 and 109. After the recording is started, when there is a recording stop instruction from the operation unit 113, the control unit 112 instructs the recording medium control unit 105 so as to stop the recording, thereby stopping the recording of the moving image data into the recording mediums 108 and 109. The control unit 112 instructs the moving image processing unit 104 so as to stop the conversion of the number of pixels and the encoding processing.

Subsequently, a relay recording will be described. In the embodiment, the apparatus has such a function that when the remaining recording capacity becomes empty during the recording of the moving image data into one of the recording mediums, even if the user does not instruct a change of the recording medium, the moving image data is continuously recorded into the other recording medium. Such a function is called a relay recording function.

In the embodiment, if both of the recording mediums 108 and 109 are loaded, by operating the operation unit 113, the user can set whether or not the relay recording is performed. In accordance with an instruction of the user, the control unit 112 controls the recording apparatus 100 so as to perform the relay recording. If the relay recording is set, after the recording of the moving image is started as mentioned above, the control unit 112 receives information showing the remaining recording capacity of the recording medium in which the moving image data is being recorded from the recording medium control unit 105. When the remaining recording capacity is smaller than a predetermined threshold value, the control unit 112 instructs the recording medium control unit 105 to stop the recording into the recording medium in which the data is being currently recorded and to start the recording into the other recording medium. For example, while the moving image data is being recorded into the recording medium 108, the recording medium control unit 105 instructs the write and read unit 106 to stop the recording by an instruction from the control unit 112 and instructs the write and read unit 107 to start the recording. The write and read unit 106 stops the recording of the moving image data into the recording medium 108, in accordance with the recording stop instruction. The write and read unit 107 starts the recording of the moving image data into the recording medium 109, in accordance with the recording start instruction. After that, if the recording stop instruction is issued from the operation unit 113, the control unit 112 instructs the recording medium control unit 105 so as to stop the recording, thereby stopping the recording of the moving image data into the recording medium 109.

Subsequently, an external recording mode will be described. In the recording apparatus according to the embodiment, in an external output mode, the photographed moving image data is output to the external recording apparatus by using at least one or a plurality of the four output units 115 to 118. By instructing the external recording apparatus to start and stop the recording in accordance with the recording start and stop instructions by the user, the moving image data which is output is recorded by the external recording apparatus. By operating the operation unit 113, the user can set the external output mode. Even when the external output mode is set, the user can set the number of pixels and the frame rate of the moving image data which is output, as mentioned above.

Figures 4, 5:
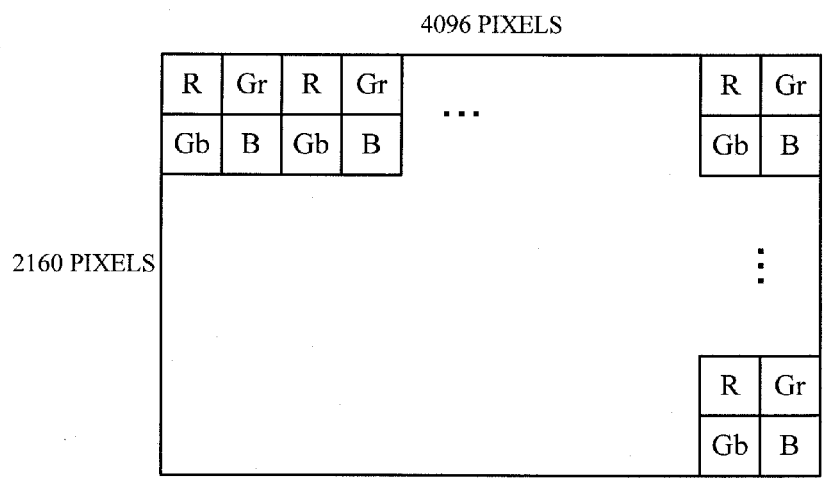
FIG. 4 is a diagram showing a bit rate of an SDI (Serial Digital Interface) format.
FIG. 5 is a diagram illustrating a pixel array of moving image data which is processed by the recording apparatus according to the first embodiment of the invention.

The output units 115 to 118 output the moving image data in accordance with the SDI standard. FIG. 4 shows relations among a type of SDI, a maximum transmission bit rate, and the number of using cables which are specified in the SMPTE or ITU-R (International Telecommunication Union Radio communications Sector). In the SD-SDI, a transmission bit rate is equal to 270 Megabits/sec (Mbps). In the HD-SDI, a transmission bit rate is equal to 1.485 Gigabits/sec (Gbps). In the DualLinkSDI and 3GSDI, a transmission bit rate is equal to 2.970 Gbps.

FIG. 5 illustrates a pixel array of the moving image data of 4K which is output in the external output mode. In the embodiment, the pixel array of the moving image data of 4K is set to a Bayer array which is used in the image pickup apparatus in the conventional art. In the Bayer array, two lines of a line in which R (red) and Gr (green) are alternately arranged and a line in which Gb (green) and B (blue) are alternately arranged are alternately arranged in the vertical direction. Each pixel is output as data of 10 bits. Therefore, a data amount per frame is equal to 88.47 Megabits (=4096×2160 pixels×10 bits).

When a frame rate of the moving image data of 4K is equal to 59.94 fps, a bit rate of the moving image data which is output is equal to 5.303 Gbps (=88.47 Mbits×59.94) (>2.970 Gbps). Therefore, in the case of outputting the moving image data by 3GSDI, it is necessary to divide the moving image data into two channels to output. In the case of outputting the moving image data by DualLinkSDI, it is necessary to divide the moving image data into four channels to output.

When the frame rate of the moving image data of 4K which is output is equal to 29.97 fps, the bit rate of the moving image data which is output is equal to 2.651 Gbps (=88.47 Mbits×29.97). Therefore, in the case of outputting the moving image data by 3GSDI, the data can be output by one channel. In the case of outputting the moving image data by DualLinkSDI, it is necessary to divide the moving image data into two channels to output.

Figure 6A:
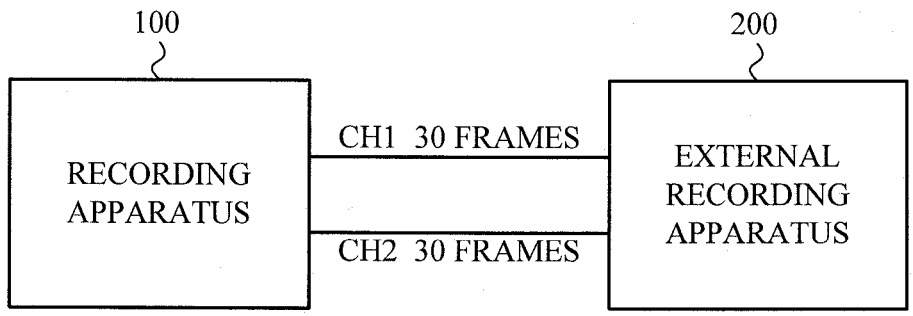
FIGS. 6A, 6B, 6C, 6D and 6E are diagrams illustrating a connection construction of the recording apparatus and the external recording apparatus in the recording system according to the invention.

In the embodiment, in the case of dividing the moving image data of 4K into two channels and outputting, the moving image data is alternately allocated to each channel every frame and is output. Therefore, the moving image data which is output by each channel is output as moving image data in which the number of frames of the original moving image data is reduced into ½. The moving image data which is divided into two channels and output as mentioned above is received by, for example, the external recording apparatus in FIG. 2 and can be recorded as one moving image data. FIG. 6A illustrates a construction of a recording system which divides the moving image of 4K and 59.94 fps into two channels (CH1, CH2) and outputs from the recording apparatus 100 to an external recording apparatus 200.

In the case of dividing the moving image data of 4K into four channels and outputting, the moving image data is sequentially allocated to each channel every frame and is output. Therefore, the moving image data which is output by each channel is output as moving image data in which the number of frames of the original moving image data is reduced into ¼. The moving image data which is divided into four channels and output as mentioned above is received by the external recording apparatus and can be recorded as one moving image data.

FIG. 7 shows a relation between the moving image data which is output and the number of channels which are used to output each moving image data. As mentioned above, by operating the operation unit 113, the user can set the number of pixels of the moving image data which is output and the frame rate. By operating the operation unit 113, the user can also set the type (the number of pixels and the frame rate) of moving image data which is output and the type of SDI which is used to output the moving image data every output channel (channel CH). By operating the operation unit 113, the user can also set whether or not the moving image data is output every channel. The output units 115 to 118 in FIG. 1 correspond to channels 1 to 4 (CH1 to CH4). In order to output the moving image of 4K and 59.94 fps by 3GSDI, two channels of SDI are necessary. Therefore, for example, in the embodiment, in the case where the user has set CH1 into 3GSDI and has set the moving image data which is output into 4K and 59.94 fps, CH2 is also automatically set into 3GSDI and the moving image data which is output is set into 4K and 59.94 fps.

In the embodiment, when the moving image data is output to the outside in the external output mode, moving image data for editing (proxy data) can be also simultaneously generated and recorded into the recording mediums 108 and 109. In the case where the moving image data of 4K is output to the outside, moving image data of HD or SD corresponding to the moving image data which is being output is generated and recorded into the recording mediums 108 and 109 concurrently with the outputting of the moving image data. In the embodiment, the moving image data of HD is recorded as editing moving image data. It is also possible to construct in such a manner that the user can select which one of the moving image data of HD and SD is recorded. In the embodiment, in the external output mode, the moving image data of 4K is output without being encoded by MPEG.

Figure 3B:
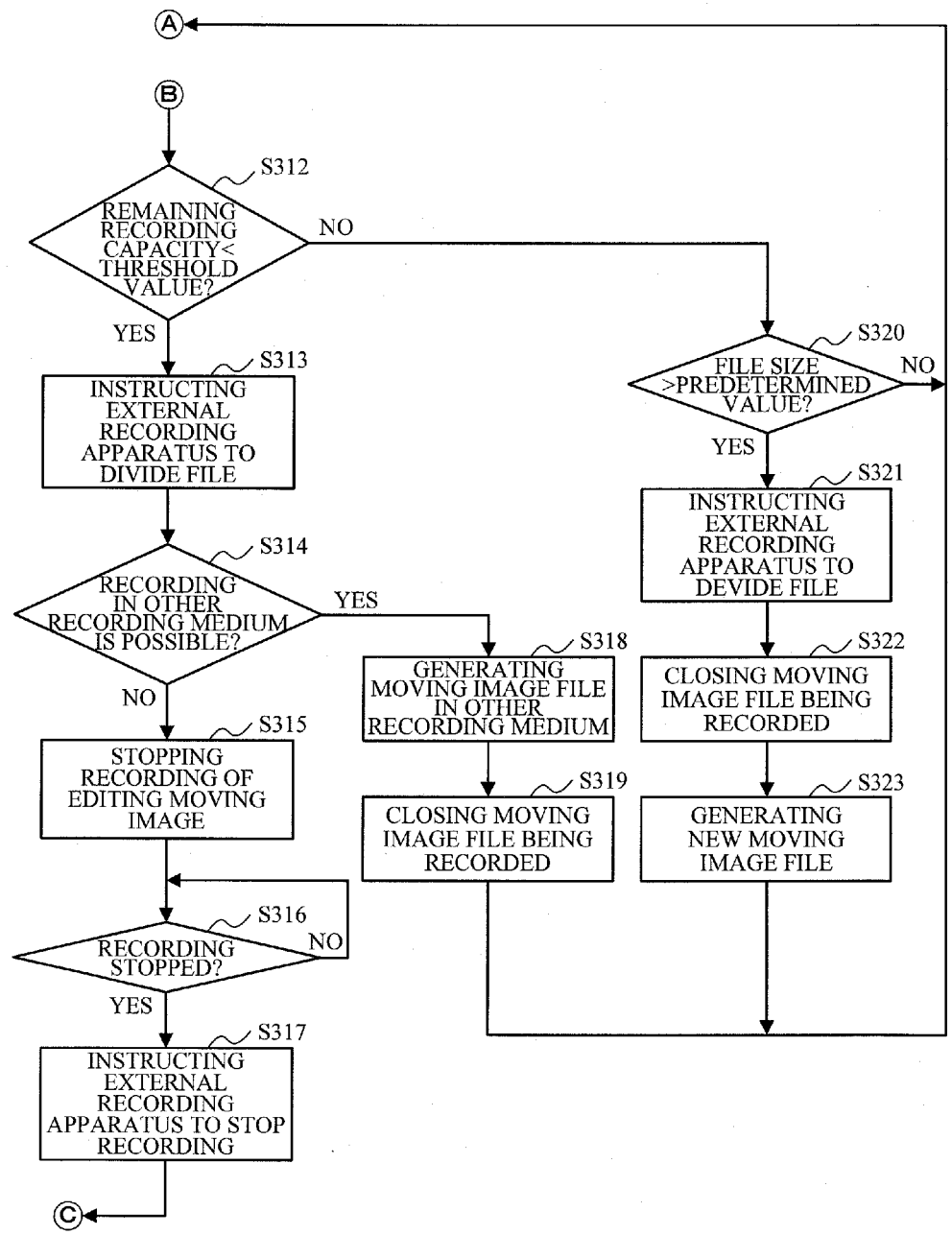
FIG. 3 is comprised of FIGS. 3A and 3B showing flowchart for the operation of the recording apparatus according to the first embodiment of the invention.

FIGS. 3A and 3B are flowcharts for the operation of the recording apparatus 100 associated with the external output mode. The operation in FIGS. 3A and 3B is executed by a method whereby the control unit 112 controls each unit of the recording apparatus 100.

Figure 6B:
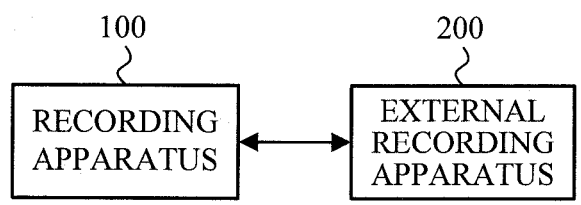

For example, as shown in FIG. 6B, in the case where the recording apparatus 100 and the external recording apparatus 200 are connected by a cable which conforms with the SDI format and the system is set into the external output mode by the user, the control unit 112 outputs the moving image data from the output units 115 to 118 (S301). In this state, the control unit 112 discriminates whether or not the recording start instruction is issued from the operation unit 113 (S302). If the recording start instruction is issued, the control unit 112 instructs the output control unit 114 so as to multiplex command data for instructing the start of the recording to the moving image data which is output from the output units 115 to 118 (S303). The output control unit 114 multiplexes the command data for the recording start to the moving image data which is output and outputs the obtained moving image data to each of the output units 115 to 118.

Figure 8:
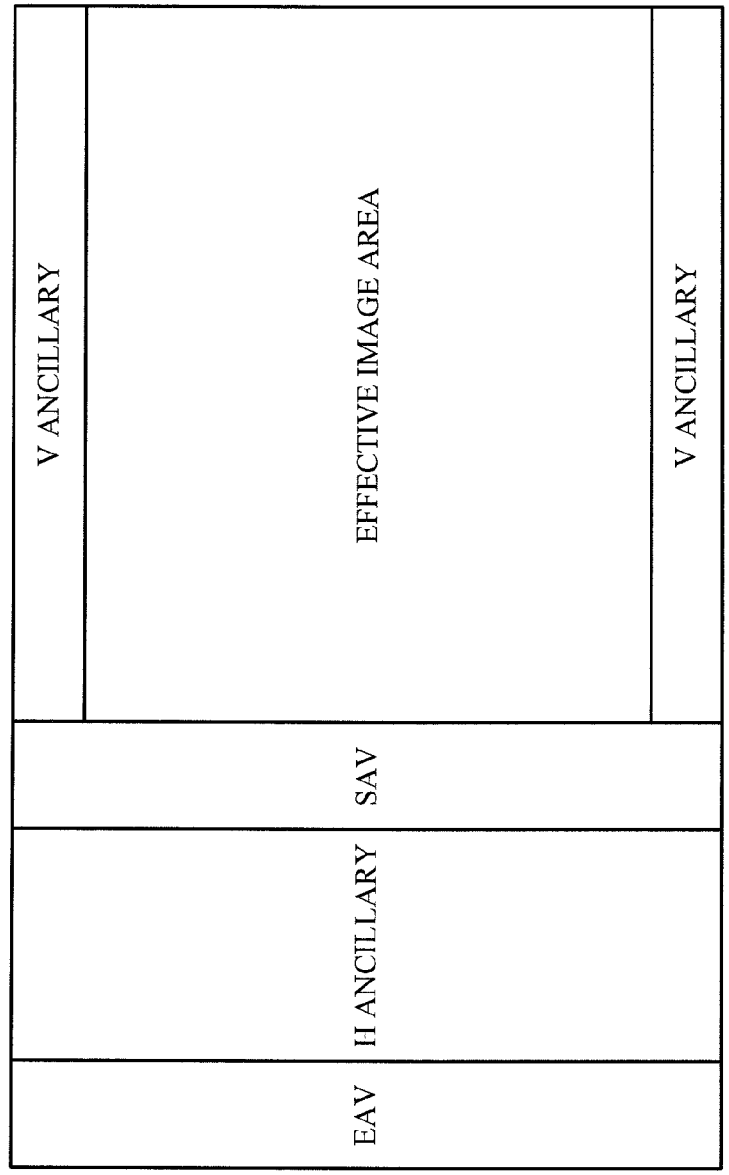
FIG. 8 is a diagram illustrating a construction of moving image data which is output from the recording apparatus according to the first embodiment of the invention.

FIG. 8 is a diagram illustrating a construction of the moving image data which is output from the output units 115 to 118 in the embodiment. In the embodiment, the moving image data is output in accordance with the SDI format. FIG. 8 shows the moving image data of one frame. The moving image data of one frame is constructed by: an EAV showing an end of a horizontal line; an H ancillary serving as ancillary data; an SAV showing a start of the horizontal line; a V ancillary serving as ancillary data; and an effective image area. In the embodiment, the recording start command data, the recording stop command data, and command data for instructing a file division, which will be described hereinafter, are multiplexed to a predetermined horizontal line in the V ancillary and the obtained moving image data is output. Information of an output state of the moving image data set by the user and the control unit 112 can be also similarly multiplexed.

By operating the operation unit 113, the user can set whether or not the moving image data for editing is generated concurrently with the outputting of the moving image to the external recording apparatus in the external output mode and recorded (S304). If the mode in which the editing moving image data is not recorded is set by the user, the control unit 112 does not generate the editing moving image data. The control unit 112 discriminates whether or not the recording stop instruction is issued from the operation unit 113 (S305). If the recording stop instruction is not issued, the moving image data is output as it is. If the recording stop instruction is issued, the control unit 112 instructs the output control unit 114 so as to multiplex the command data for instructing the recording stop to the moving image data which is output from the output units 115 to 118 (S306). The output control unit 114 multiplexes the recording stop command data to the moving image data which is output and outputs the obtained moving image data to the output units 115 to 118.

If the mode in which the editing moving image data is recorded is set by the user, the control unit 112 obtains a detection result about whether or not the recording mediums 108 and 109 are loaded and the information of the remaining recording capacity of each recording medium from the recording medium control unit 105. On the basis of those information, whether or not the editing moving image data can be recorded into each recording medium is discriminated (S307). If both of the recording mediums are not loaded or the remaining recording capacity of each recording medium is empty, the control unit 112 determines that the editing moving image data cannot be recorded, and does not generate the editing moving image data. In this case, a message showing that although the mode for recording the editing moving image data is set, the editing moving image data cannot be recorded may be displayed to the display unit 111 by the control unit 112. The control unit 112 discriminates whether or not the recording stop instruction is issued from the operation unit 113 (S305). If the recording stop instruction is not issued, the moving image data is output as it is. If the recording stop instruction is issued, the control unit 112 instructs the output control unit 114 so as to multiplex the command data for instructing the recording stop to the moving image data which is output from the output units 115 to 118 (S306). The output control unit 114 multiplexes the recording stop command data to the moving image data which is output and outputs the obtained moving image data to the output units 115 to 118.

If the editing moving image data can be recorded into at least one of the recording mediums, the control unit 112 controls the moving image processing unit 104 so as to generate the editing moving image data. The control unit 112 instructs the recording medium control unit 105 so as to record the editing moving image data (S308). If the editing moving image data can be recorded into both of the two recording mediums 108 and 109, the control unit 112 selects the recording medium having the larger remaining recording capacity and instructs the recording medium control unit 105 so as to record the editing moving image data into the selected recording medium. The recording medium control unit 105 generates a moving image file for recording the editing moving image data into the recording medium designated by the control unit 112 and instructs the write and read units 106 and 107 so as to store the moving image data into the moving image file and record.

After the recording of the editing moving image data is started, the control unit 112 discriminates whether or not the recording stop instruction is issued (S309). If the recording stop instruction is issued, the control unit 112 instructs the output control unit 114 so as to multiplex the command data for instructing the stop of the recording to the moving image data which is output from the output units 115 to 118 (S310). The output control unit 114 multiplexes the recording stop command data to the moving image data which is output and outputs the obtained moving image data to the output units 115 to 118. The control unit 112 stops the creation of the editing moving image data which is executed by the moving image processing unit 104 and stops the recording (S311).

If the recording stop instruction is not issued, on the basis of the information of the remaining recording capacity from the recording medium control unit 105, the control unit 112 discriminates whether or not the remaining recording capacity of the recording medium in which the editing moving image data is being recorded is less than a predetermined threshold value (S312). In the embodiment, when the remaining recording capacity is less than the predetermined threshold value, it is determined that the remaining recording capacity of the recording medium becomes empty. If the remaining recording capacity is less than the threshold value, the control unit 112 instructs the output control unit 114 so as to multiplex the command data for instructing the file division to the moving image data which is output from the output units 115 to 118 (S313). In the external recording apparatus 200, when the file dividing command is received, the moving image file which is being recorded is closed, a new moving image file is generated, and the recording is continued as will be described hereinafter. The control unit 112 discriminates whether or not the moving image data can be recorded into a recording medium other than the recording medium which is currently selected (S314). For example, if the recording medium 118 is selected and the editing moving image data is recorded therein, the control unit 112 discriminates whether or not the moving image data can be recorded into the recording medium 109.

If the moving image data cannot be recorded into the other recording medium, the control unit 112 stops the creation and recording of the editing moving image data after that (S315).

The control unit 112 discriminates whether or not the recording stop instruction is issued from the operation unit 113 (S316). If the recording stop instruction is not issued, the moving image data is output as it is. If the recording stop instruction is issued, the control unit 112 instructs the output control unit 114 so as to multiplex the command data for instructing the recording stop to the moving image data which is output from the output units 115 to 118 (S317). The output control unit 114 multiplexes the recording stop command data to the moving image data which is output and outputs the obtained moving image data to the output units 115 to 118.

If the moving image data can be recorded into the other recording medium, the control unit 112 instructs the recording medium control unit 105 so as to newly generate a moving image file and record the editing moving image data into the other recording medium (S318). The recording medium control unit 105 generates a moving image file in order to record the editing moving image data into the recording medium designated by the control unit 112 and instructs the write and read units 106 and 107 so as to store the editing moving image data into the moving image file and record. Subsequently, the control unit 112 instructs the recording medium control unit 105 so as to stop the recording of the editing moving image data which is being currently recorded. The recording medium control unit 105 instructs the write and read units 106 and 107 so as to stop the recording of the editing moving image data which is being recorded into the recording medium designated by the control unit 112 and to close the moving image file (S319).

When the remaining recording capacity of the recording medium is not less than the predetermined threshold value, the control unit 112 discriminates whether or not a size of editing moving image file has reached a predetermined value on the basis of information of the size of recorded editing moving image file which is obtained from the recording medium control unit 105 (S320). In the embodiment, the moving image data recorded in the recording mediums 108 and 109 is managed in accordance with a predetermined file system. Therefore, when the size of moving image file which is being recorded has reached an upper limit value of the file size specified by the file system, the moving image file which is being recorded is temporarily closed, a new moving image file is generated, and the recording is continued. Therefore, in the embodiment, a value which is smaller than the upper limit value of the file size specified by the file system by a predetermined amount is set as a predetermined value. When the size of moving image file which is being recorded is equal to or less than the predetermined value, the recording is continued as it is.

When the size of moving image file which is being recorded exceeds the predetermined value, the control unit 112 instructs the output control unit 114 so as to multiplex the command data to instruct the file division to the moving image data which is output from the output units 115 to 118 (S321). Subsequently, the control unit 112 closes the moving image file of the editing moving image data which is being currently recorded (S323) and instructs the recording medium control unit 105 so as to newly generate a moving image file and continue the recording of the editing moving image data (S323). The recording medium control unit 105 controls the write and read units 106 and 107, closes the moving image file which is being currently recorded, newly generates a moving image file, and continues the recording of the moving image data.

Figure 2:
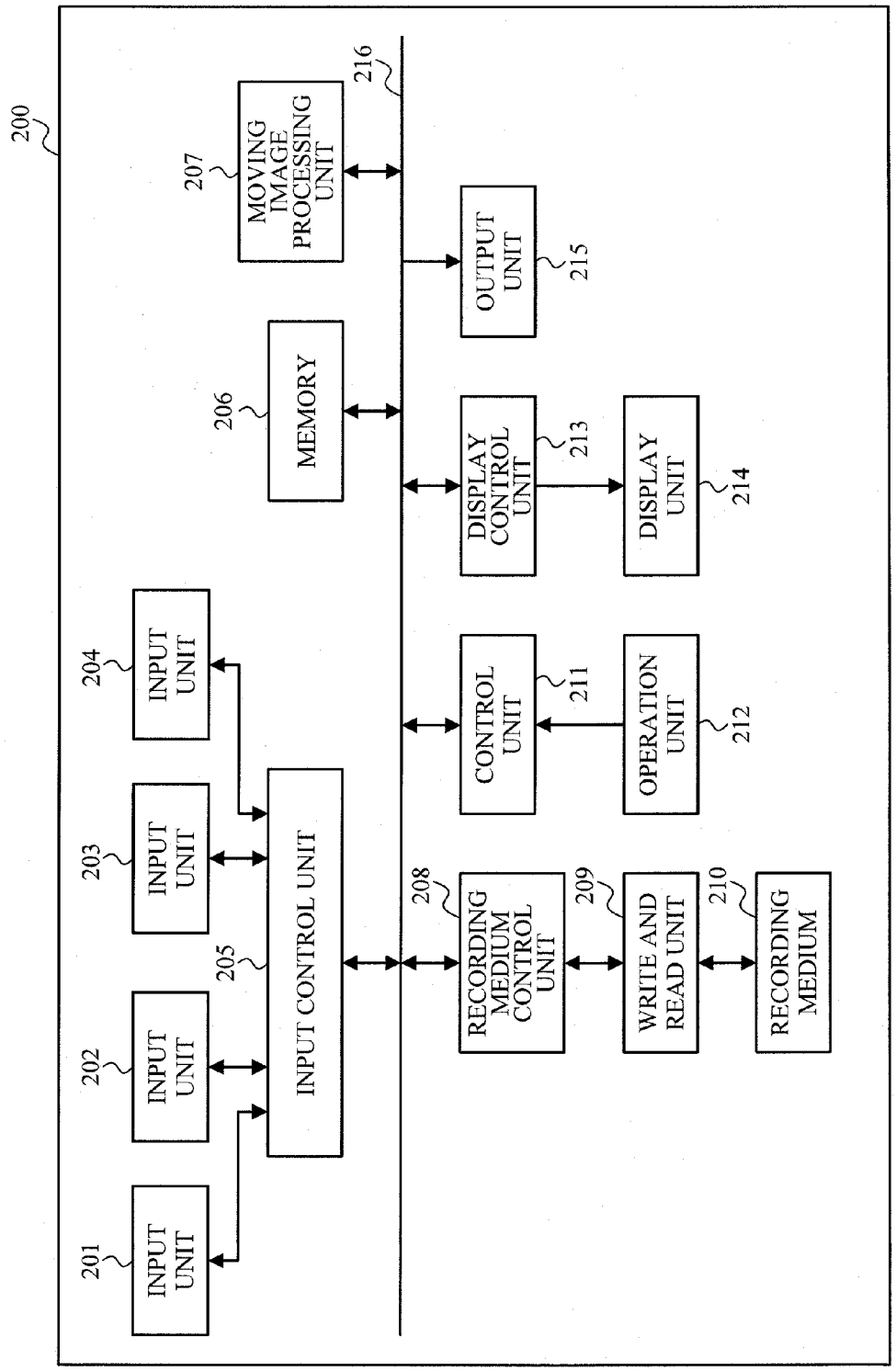
FIG. 2 is a block diagram illustrating a construction of an external recording apparatus constructing the recording apparatus in FIG. 1 and a recording system.

Subsequently, the external recording apparatus for receiving the moving image data which is output from the recording apparatus 100 and recording will be described. FIG. 2 is a block diagram illustrating a construction of the external recording apparatus 200.

In FIG. 2, input units 201 to 204 input the moving image data which is output from the recording apparatus 100 in accordance with the SDI format, respectively. On the basis of the SDI format and a type of moving image data of each input unit which is set by a control unit 211, an input control unit 205 receives the moving image data which is input and outputs to a memory 206.

The memory 206 stores the moving image data and other data. Each block of the external recording apparatus 200 executes necessary processings by accessing the memory 206. Besides the moving image data, the memory 206 also stores various kinds of information such as information of the file system, management information, and the like. Further, the memory 206 plays a role of a work memory or the like for control which is made by the control unit 112. The memory 206 also plays a role of a buffer memory at the time of recording and reproduction of data.

A moving image processing unit 207 converts the number of pixels of the moving image data. When the recorded moving image data is encoded, the moving image processing unit 207 decodes the reproduced moving image data. In the case of outputting the reproduced moving image data, the moving image processing unit 207 converts the moving image data in accordance with an output format which is set by the user.

A recording medium control unit 208 outputs a write instruction and a read instruction of data to a write and read unit 209. The recording medium control unit 208 outputs data to be recorded to the write and read unit 209 and receives reproduced data from the write and read unit 209. The recording medium control unit 208 receives information of a remaining recording capacity of a recording medium 210 and the like from the write and read unit 209.

The write and read unit 209 writes and reads out the moving image data and various kinds of information into/from the recording medium 210. Upon recording, the write and read unit 209 records the moving image data into the recording medium 210. Upon reproduction, the write and read unit 209 reads out the moving image data from the recording medium 210 and transmits to the recording medium control unit 208. In the embodiment, the recording medium 210 is a random access recording medium such as hard disk (HDD) built in the recording apparatus 200, flash memory card, or the like. The recording medium 210 may be constructed in such a manner that the recording mediums 108 and 109 can be easily loaded and unloaded into/from the recording apparatus 100 by a loading and unloading mechanism (not shown).

The recording medium control unit 208 manages the moving image data and various kinds of information which are recorded into the recording medium 210 as files in accordance with a file system such as an FAT (File Allocation Table) or the like. The recording medium control unit 105 has a well-known interface (IF) such as an ATA (AT Attachment) or the like and communicates data and various kinds of commands with a recording medium IF in the control unit 211. In the embodiment, the recording medium control unit 208 manages the files recorded in the recording medium 210 in accordance with a file system such as an exFAT or the like in which an upper limit size of the file size is not substantially specified. Therefore, the moving image data of a high data rate such as 4K data or the like which is output from the recording apparatus 100 can be stored into one file and managed.

In the embodiment, the moving image data which is recorded for a period of time from the start to stop of the recording is managed as one file. If a mode in which the moving image data which is input from the input units 201 to 204 is collectively recorded as one data is set, the collected one moving image data is managed as one moving image file. However, in the case where moving image data such as 4K data whose data rate is high is stored into one file, a file size is large and there is a case where it is inconvenient to handle the file. Therefore, it is also possible to construct in such a manner that the moving image data which is input for a period of time from the start to stop of the recording is divided into a plurality of files and recorded and those plurality of files are managed as one scene or clip. In the case where the moving image data which is input in a period of time from the start to stop of the recording is recorded as a plurality of files as mentioned above, the recording apparatus 200 newly generates a scene or clip in response to the file division command from the recording apparatus 100. In the case where the moving image data which is input in a period of time from the start to stop of the recording or to the file division instruction is recorded as a plurality of files as mentioned above, those plurality of moving image files are stored into one folder to be managed. That is, each time the recording of one scene or clip is started, one folder is generated.

The control unit 211 controls the whole operation of the recording apparatus 200 in accordance with an input from an operation unit 212. The control unit 211 includes a microcomputer, a memory, or the like and controls the recording apparatus 200 in accordance with a program stored in the memory (not shown). The control unit 211 also includes a recording medium interface for communicating data and commands with the recording medium control unit 208. The operation unit 212 includes various kinds of switches which can be operated by the user. The operation unit 212 receives various kinds of instructions or the like which are made by the user and notifies the control unit 211 of them. The control unit 211 also includes a power switch, switches for instructing the start and stop of the recording, a switch for switching modes of the recording apparatus 200, and the like.

In the case of writing and reading out a moving image file into/from the recording medium 210, the control unit 211 controls the recording medium control unit 208 so as to read out file system data (management data) from the recording medium 210 and store into the memory 206. The file system data is data showing file names of the data recorded in the recording medium 210, sizes of the files, recording addresses of the data, and the like and is management information to manage the files. The control unit 211 controls writing and reading of the files in accordance with the read-out file system data. In accordance with the writing of the files into the recording medium 210, the control unit 211 updates the file system data stored in the memory 206. The updated file system data is recorded into the recording medium 210 by the recording medium control unit 208. A display control unit 213 displays an image and other information to a display unit 214. The display unit 214 includes a liquid crystal display apparatus, an organic EL apparatus, or the like. An output unit 215 outputs the moving image data which is input or the moving image data which is reproduced to the outside.

Subsequently, processings in the case where the moving image data which is input by the input units 201 to 204 is recorded into the recording medium by the recording apparatus 200 will be described.

By operating the operation unit 212, the user can set the number of pixels and the frame rate of the moving image data which is input from the input units 201 to 204 and the SDI format in the input units 201 to 204. By setting the input units 201 to 204 in accordance with the number of pixels and the frame rate of the moving image data which are set in the output units 115 to 118 of the recording apparatus 100 and the SDI format, the user can input and record the moving image data which is output from the recording apparatus 100.

After a power source of the recording apparatus 200 is turned on, the user connects the output units 115 to 118 of the recording apparatus 100 and the input units 201 to 204 by cables which conform with the SDI format and sets the moving image data which is input from the input units 201 to 204 and the SDI format as mentioned above. When the recording apparatus 100 is set into the external output mode, the moving image data is input into the input units 201 to 204 from the recording apparatus 100.

In this recording standby state, when the user instructs the start of recording by operating the operation unit 212, the control unit 211 instructs so that the moving image data which is input from the input units 201 to 204 is recorded into the recording medium 210. At this time, the user can select the moving image data to be recorded in the moving image data which is input from the input units 201 to 204. The user can also instruct so as to collectively (as one file) record one of the selected moving image data among the moving image data which is input from the input units 201 to 204. When the user instructs the stop of recording by operating the operation unit 212, the recording of the moving image data into the recording medium 210 is stopped.

As mentioned above, the input control unit 205 detects the recording start command and recording stop command multiplexed to the moving image data which is output from the recording apparatus 100 and transmits to the control unit 211. In accordance with the recording start command data, the control unit 211 generates a moving image file into the recording medium 210 and starts the recording of the moving image data which is input from the input units 201 to 204. In accordance with the recording stop command data, the control unit 211 closes the moving image file which is being recorded and stops the recording of the moving image data which is input from the input units 201 to 204. In this case, the input units may be set in such a manner that if information of an output state in the recording apparatus is multiplexed to the received moving image data, such a fact is detected and displayed, or the like. The control unit 211 closes the moving image file which is being recorded in accordance with the command data to instruct the file division, newly generates a moving image file, and continues the recording of the moving image data.

As mentioned above, in the embodiment, in the case of outputting the moving image data to the external recording apparatus or the like in the external output mode, the editing moving image data is generated into its own recording medium concurrently with the outputting of the moving image data and recorded. Therefore, there is no need to generate the editing moving image data later. In the embodiment, if the moving image file of the editing moving image data is closed, the external recording apparatus is instructed to divide the moving image file. Therefore, both of the editing moving image data recorded in the recording medium and the moving image data recorded in the external recording apparatus can be easily associated with each other. According to the embodiment, a recording time (the number of frames) of the moving image data stored in the moving image file which is recorded by the external recording apparatus 200 and a recording time of the editing moving image data which is stored in the moving image file which is recorded into the recording mediums 108 and 109 coincide. Therefore, by designating an editing point by using the editing moving image data, the corresponding moving image data can be easily edited.

Although the recording apparatus 100 is constructed so as to record the moving image data into the two recording mediums in the embodiment, it is also possible to construct in such a manner that the moving image data can be recorded into three or more recording mediums. The moving image data can be also output in accordance with a format other than the SDI format. Although the moving image data having less number of pixels than that of the moving image data which is output to the outside is recorded as editing moving image data, the moving image data in which an information amount is smaller than that of the moving image data which is output to the outside can be also used as the editing moving image data. Although the apparatus has four output units and the moving image data is output by using the output units of four channels in the embodiment, the number of channels is not limited to 4 but a plurality of channels can be used.

Subsequently, the second embodiment of the invention will be described. Also in the second embodiment, constructions of the recording apparatus 100 and the external recording apparatus 200 are similar to those in the first embodiment.

Figure 9B:
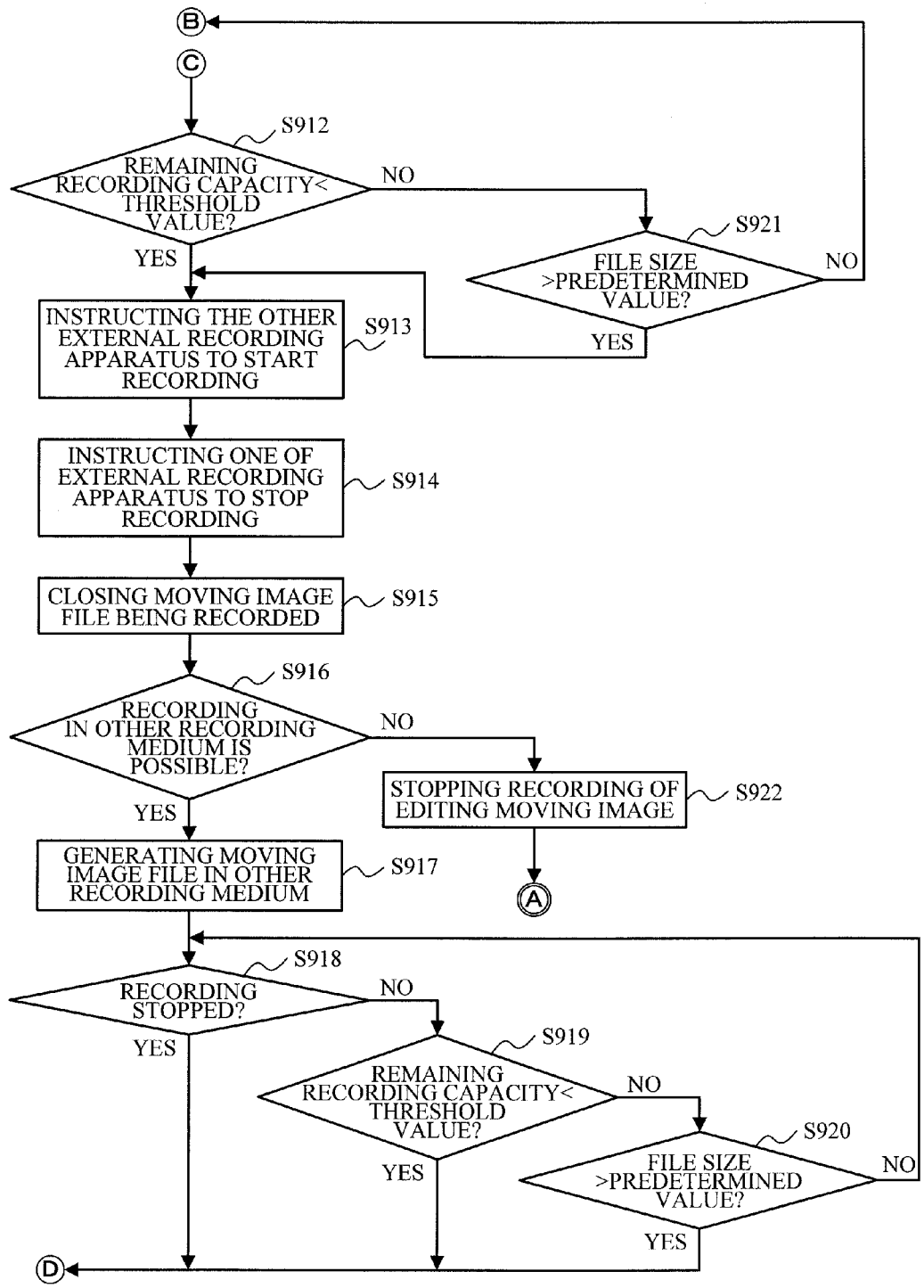
FIG. 9 is comprised of FIGS. 9A and 9B showing flowchart for the operation of a recording apparatus according to the second embodiment of the invention.

FIGS. 9A and 9B are flowcharts for the operation of the recording apparatus 100 regarding the external output mode in the embodiment. The operation in FIGS. 9A and 9B is also executed by a method whereby the control unit 112 controls each unit of the recording apparatus 100.

Figure 6C:
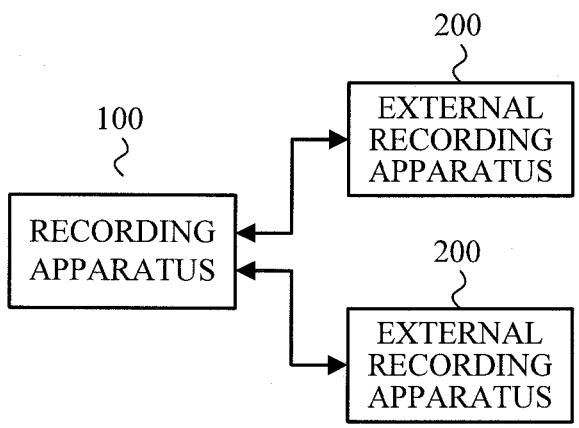

In the embodiment, a system is constructed in such a manner that the recording apparatus 100 (first recording apparatus) and the two external recording apparatuses 200 (second recording apparatus, third recording apparatus) are connected by cables which conform with the SDI format as illustrated in FIG. 6C and the moving image data is recorded by the two recording apparatuses 200.

As illustrated in FIG. 6C, the recording apparatus 100 and the two external recording apparatuses 200 are connected. When the system is set into the external output mode by the user, the control unit 112 outputs the moving image data to the output units 115 to 118 (S901).

In this state, the control unit 112 discriminates whether or not the recording start instruction is issued from the operation unit 113 (S902). In the embodiment, the user selects one of the two external recording apparatuses 200 and instructs the selected recording apparatus to record the moving image data. When the recording start instruction is issued, the control unit 112 instructs the output control unit 114 so as to multiplex the command data for instructing the start of the recording to the moving image data which is output to the selected recording apparatus 200 in the moving image data which is output from the output units 115 to 118 (S903). The output control unit 114 multiplexes the recording start command data to the moving image data which is output to the selected recording apparatus 200 and outputs the obtained moving image data to the output units 115 to 118.

Subsequently, the control unit 112 discriminates whether or not a mode for recording the editing moving image data is set (S904). If a mode in which the editing moving image data is not recorded is set by the user, the control unit 112 controls so that the editing moving image data is not generated. The control unit 112 discriminates whether or not the recording stop instruction is issued from the operation unit 113 (S905). If the recording stop instruction is not issued, the moving image data is output as it is. If the recording stop instruction is issued, the control unit 112 instructs the output control unit 114 so as to multiplex the command data for instructing the stop of the recording to the moving image data which is output to the recording apparatus in which the moving image is being recorded among the moving image data which is output from the output units 115 to 118 (S906). The output control unit 114 multiplexes the recording stop command data to the moving image data which is output and outputs the obtained moving image data to the output units 115 to 118.

If the mode for recording the editing moving image data is set, the control unit 112 discriminates whether or not the moving image data can be recorded into the recording mediums 108 and 109 (S907). If none of the recording mediums are loaded or if the remaining recording capacities of the recording mediums are empty, the control unit 112 determines that the editing moving image data cannot be recorded. The control unit 112 controls so as not to record the editing moving image data and discriminates whether or not the recording stop instruction is issued from the operation unit 113 (S905). If the recording stop instruction is not issued, the moving image data is output as it is. If the recording stop instruction is issued, the control unit 112 instructs the output control unit 114 so as to multiplex the command data for instructing the stop of the recording to the moving image data which is output to the recording apparatus in which the moving image is being recorded in the moving image data which is output from the output units 115 to 118 (S906). The output control unit 114 multiplexes the recording stop command data to the moving image data which is output and outputs the obtained moving image data to the output units 115 to 118. A message showing that although the mode for recording the editing moving image data is set, the editing moving image data cannot be recorded may be displayed to the display unit 111 by the control unit 112.

If the editing moving image data can be recorded into at least one of the recording mediums, the control unit 112 controls the moving image processing unit 104 so as to generate editing moving image data. The control unit 112 instructs the recording medium control unit 105 so as to record the editing moving image data (S908). If the moving image data can be recorded into both of the two recording mediums 108 and 109, the control unit 112 selects the recording medium having the larger remaining recording capacity and instructs the recording medium control unit 105 so as to record the editing moving image data into the selected recording medium. The recording medium control unit 105 generates a moving image file in order to record the editing moving image data into the recording medium designated by the control unit 112 and instructs the write and read units 106 and 107 so as to store the editing moving image data into the moving image file and record.

After the recording of the editing moving image data is started, the control unit 112 discriminates whether or not the recording stop instruction is issued (S909). If the recording stop instruction is issued, the control unit 112 instructs the output control unit 114 so as to multiplex the command data for instructing the recording stop to the moving image data which is output to the recording apparatus in which the moving image is being recording (S910). The output control unit 114 multiplexes the recording stop command data to the moving image data which is output and outputs the obtained moving image data to the output units 115 to 118. The control unit 112 stops the creation of the editing moving image data which is executed by the moving image processing unit 104 and stops the recording (S911).

If the recording stop instruction is not issued, on the basis of the information of the remaining recording capacity from the recording medium control unit 105, the control unit 112 discriminates whether or not the remaining recording capacity of the recording medium in which the editing moving image data is being recorded is less than the predetermined threshold value (S912). When the remaining recording capacity of the recording medium is less than the threshold value, the control unit 112 instructs the output control unit 114 to execute the subsequent operation. That is, the control unit 112 instructs the output control unit 114 so as to multiplex the command data for instructing the recording start to the moving image data which is output to the external recording apparatus 200 in which the moving image is not being recorded among the moving image data which is output from the output units 115 to 118 (S913). By this instruction, the recording of the moving image which is executed by the other recording apparatus 200 is started. The control unit 112 also instructs the output control unit 114 so as to multiplex the command data for instructing the recording stop to the moving image data which is output to the recording apparatus 200 in which the moving image is being recorded (S914). Subsequently, the control unit 112 instructs the recording medium control unit 105 so as to stop the recording of the editing moving image data which is being currently recorded (S915). The recording medium control unit 105 instructs the write and read units 106 and 107 so as to stop the recording of the editing moving image data which is being recorded into the recording medium designated by the control unit 112 and to close the moving image file. The control unit 112 discriminates whether or not the editing moving image data can be recorded into the recording medium other than the recording medium selected currently (S916). For example, in the case where the recording medium 108 is selected and the editing moving image data is recorded therein, the control unit 112 discriminates whether or not the editing moving image data can be recorded into the recording medium 109.

If the moving image data cannot be recorded into the other recording medium, the control unit 112 stops the subsequent creation and recording of the editing moving image data (S922). In this case, a message showing that although the mode for recording the editing moving image data is set, the editing moving image data cannot be recorded may be displayed to the display unit 111 by the control unit 112. The control unit 112 discriminates whether or not the recording stop instruction is issued from the operation unit 113 (S905). If the recording stop instruction is not issued, the moving image data is output as it is. If the recording stop instruction is issued, the control unit 112 instructs the output control unit 114 so as to multiplex the command data for instructing the recording stop to the moving image data which is output to the recording apparatus 200 in which the moving image is being recorded (S906). The output control unit 114 multiplexes the recording stop command data to the moving image data which is output and outputs the obtained moving image data to the output units 115 to 118.

If the editing moving image data can be recorded into the other recording medium, the control unit 112 instructs the recording medium control unit 105 to newly generate a moving image file into the other recording medium and record the editing moving image data (S917). The recording medium control unit 105 generates a moving image file into the recording medium designated by the control unit 112 in order to record the editing moving image data and instructs the write and read units 106 and 107 so as to store the moving image data into the moving image file and record.

Subsequently, the control unit 112 discriminates whether or not the recording stop instruction is issued (S918). If the recording stop instruction is not issued, the control unit 112 discriminates whether or not the remaining recording capacity of the other recording medium is less than the threshold value (S919). When the remaining recording capacity is equal to or larger than the threshold value, the control unit 112 discriminates whether or not a size of moving image file for editing which is being recorded reaches a predetermined value (S920). If the size of the editing moving image file is equal to or less than the predetermined value, the outputting of the moving image data and the recording of the editing moving image file are continued as they are. If the recording stop instruction is issued in S918, when the remaining recording capacity is less than the threshold value in S919, or if the file size reaches the predetermined value in S920, the control unit 112 stops the recording of the moving image. That is, the control unit 112 instructs the output control unit 114 to multiplex the command data for instructing the recording stop to the moving image data which is output to the recording apparatus in which the moving image is being recorded (S910). The output control unit 114 multiplexes the recording stop command data to the moving image data which is output and outputs the obtained moving image data to the output units 115 to 118. The control unit 112 stops the creation of the editing moving image data which is executed by the moving image processing unit 104 and stops the recording of editing moving image data (S911).

If the remaining recording capacity of the recording medium is equal to or larger than the threshold value in S912, the control unit 112 discriminates whether or not the size of the editing moving image file exceeds the predetermined value (S921) on the basis of the information of the size of the recorded moving image file obtained from the recording medium control unit 105. If the size of the editing moving image file which is being recorded is equal to or less than the predetermined value, the recording is continued as it is. If the size of the editing moving image file which is being recorded exceeds the predetermined value, the control unit 112 instructs the output control unit 114 to multiplex the command data for instructing the start of the recording to the moving image data which is output to the recording apparatus 200 in which is the moving image is not being recorded (S913). Then, the foregoing processings are executed.

As mentioned above, if the moving image file of the editing moving image data which is being recorded is closed when the moving image data is being recorded to one of the external recording apparatuses, the recording stop is instructed to the one recording apparatus and the recording start is instructed to the other recording apparatus. Therefore, both of the editing moving image data which is recorded into the recording medium and the moving image data which is recorded into the external recording apparatus can be easily associated with each other. According to the embodiment, the recording time (the number of frames) of the moving image data stored in the moving image file which is recorded by each external recording apparatus 200 and the recording time of the editing moving image data which is stored in the moving image file which is recorded into the recording mediums 108 and 109 coincide. Therefore, by designating the editing point by using the editing moving image data, the corresponding moving image data can be easily edited.

In the embodiment, when the size of the editing moving image file exceeds the predetermined value in S921, the external recording apparatus in which the moving image file is being currently recorded is instructed to stop the recording and the other recording apparatus is instructed to start the recording. However, it is also possible to construct in such a manner that when the size of the editing moving image file exceeds the predetermined value, the external recording apparatus in which the moving image file is being currently recorded is instructed to divide the file and to continue the recording as it is.

The third embodiment of the invention will now be described.

Figure 10A:
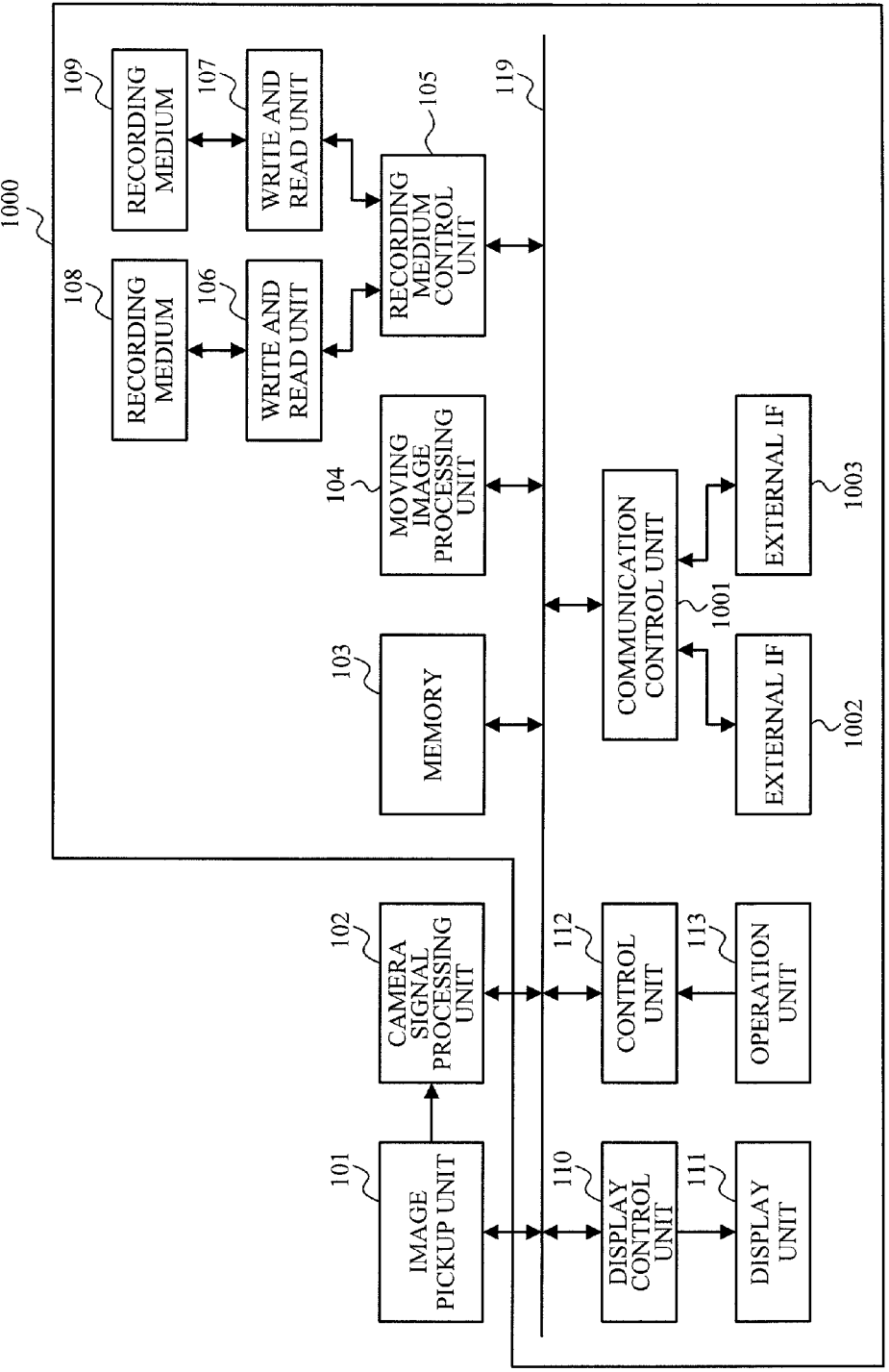
FIGS. 10A and 10B are block diagrams illustrating a construction of a recording apparatus and an external recording apparatus according to the third embodiment of the invention.
Figure 10B:
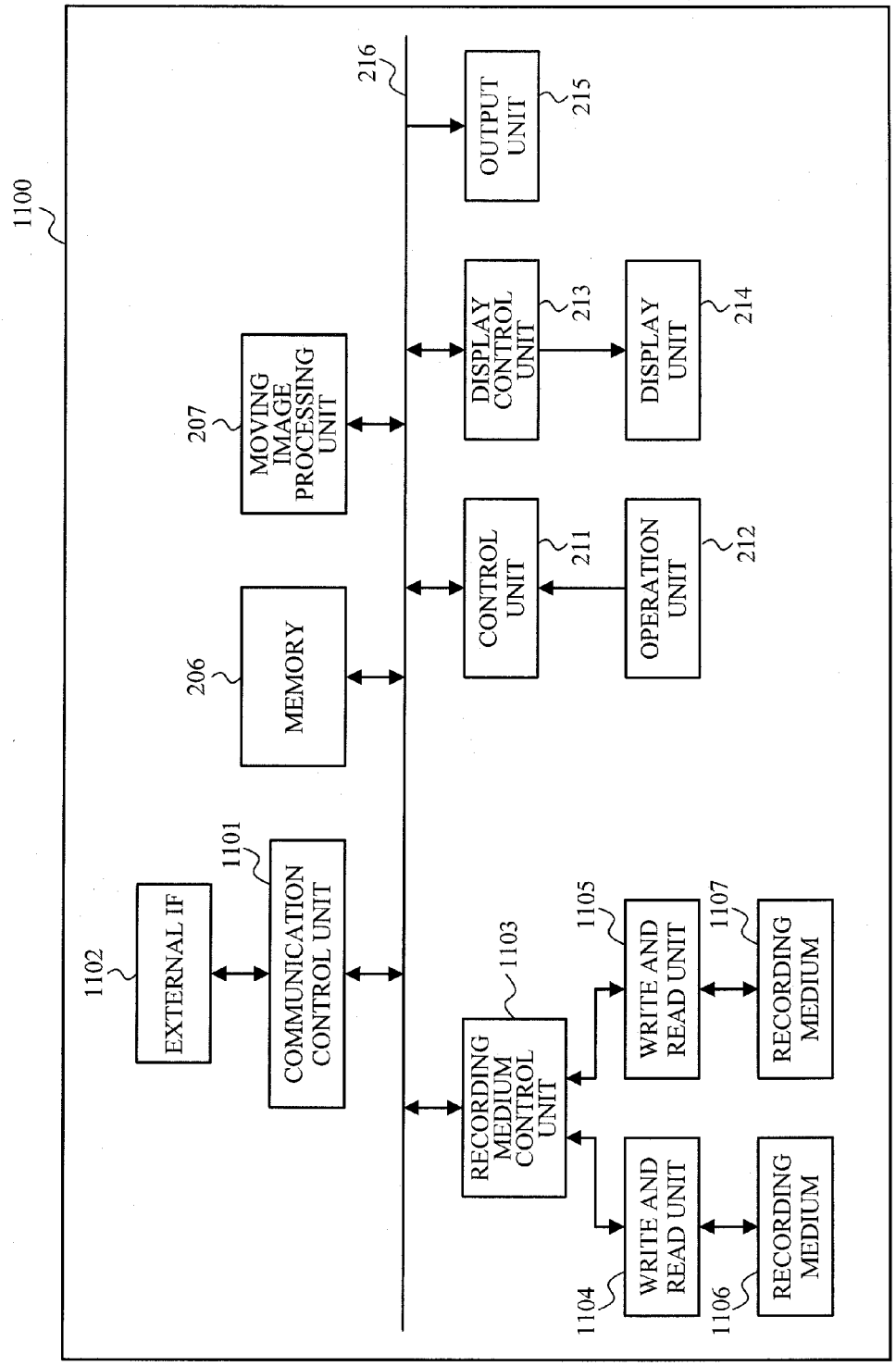

FIGS. 10A and 10B are block diagrams illustrating a construction of a recording apparatus 1000 and an external recording apparatus 1100 according to the third embodiment of the invention. The third embodiment differs from the foregoing embodiments with respect to a point that moving image data is output to the external recording apparatus in accordance with "DisplayPort". "DisplayPort" is such a format that bidirectional communication can be performed. Other constructions of the recording apparatus 1000 according to the embodiment are similar to those of the recording apparatus 100 in the first and second embodiments and their functions are also similar to those of the first and second embodiments. Constructions of the external recording apparatus 1100 other than the inputting construction of the moving image data and the recording construction of the moving image are similar to those of the recording apparatus 200 in the first and second embodiments and their functions are also similar to those of the first and second embodiments. In FIGS. 10A and 10B, the same component elements as those in the construction in FIGS. 1 and 2 are designated by the same reference numerals and their detailed description is omitted.

In the recording apparatus 1000, a communication control unit 1001 outputs the designated moving image data to external IFs 1002 and 1003 in response to an instruction from the control unit 112. The communication control unit 1001 transmits the command data such as recording start command, recording stop command, and the like to the external recording apparatus 1100. The communication control unit 1001 receives various kinds of information which is output from the external recording apparatus 1100 and notifies the control unit 112 of them. Each of the external IFs 1002 and 1003 has a connector and the like corresponding to DisplayPort, outputs the moving image data to the external recording apparatus 1100, and transmits and receives various kinds of information to/from an external apparatus.

In the recording apparatus 1100, a communication control unit 1101 receives the moving image data from an external IF 1102 in response to an instruction from the control unit 211 and outputs to the memory 206. The communication control unit 1101 receives the command data such as recording start command, recording stop command, and the like from the recording apparatus 1000. The communication control unit 1101 also receives various kinds of information which are output from the recording apparatus 1000 and notifies the control unit 211 of them. The communication IF 1102 has a connector and the like corresponding to DisplayPort, receives the moving image data from the recording apparatus 1000, and transmits and receives various kinds of information to/from an external apparatus.

The recording apparatus 1100 selects one of two recording mediums 1106 and 1107 and records the moving image data into the selected recording medium. A recording medium control unit 1103 controls write and read units 1104 and 1105 so as to record and reproduce the moving image data and various kinds of information into/from the recording mediums 1106 and 1107, respectively. The recording apparatus 1100 has a relay recording function.

Also in the embodiment, the processings shown in the flowcharts of FIGS. 3 and 9 are executed. In the embodiment, the recording apparatus 1000 further receives a file division request or a recording stop request from the external recording apparatus 1100.

Figure 11B:
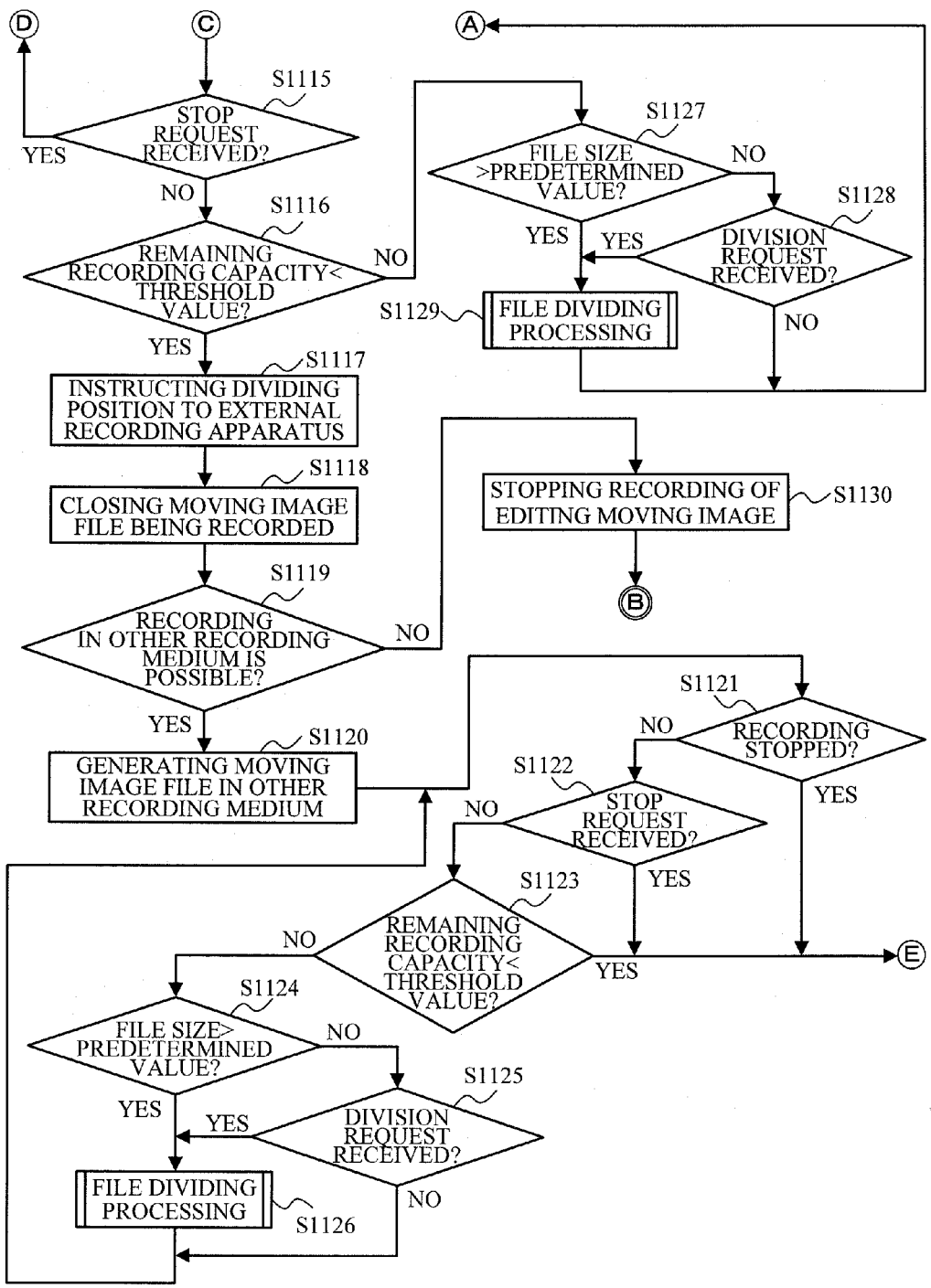
FIG. 11 is comprised of FIGS. 11A and 11B showing flowchart for the operation of the recording apparatus according to the third embodiment of the invention.

FIGS. 11A and 11B are flowcharts for the operation associated with the external output mode of the recording apparatus 1000 according to the embodiment. The operation in FIGS. 11A and 11B is executed by a method whereby the control unit 112 controls each unit of the recording apparatus 1000.

Figure 6D:
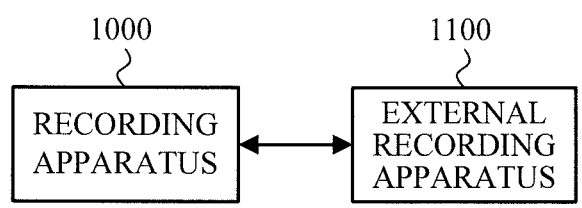

In the embodiment, as shown in FIG. 6D, a system is constructed in such a manner that the recording apparatus 1000 and the external recording apparatus 1100 are connected by a cable which conforms with DisplayPort and the moving image data is recorded by the recording apparatus 1100. In the embodiment, a time code (showing hour, minute, second, and frame) regarding a time elapsed from the recording start is generated by the control unit 112, the time code is multiplexed to each frame of the moving image data, and the obtained moving image data is output.

As shown in FIG. 6D, in the case where the recording apparatus 1000 and the external recording apparatus 1100 are connected and the external output mode is set by the user, the control unit 112 instructs the communication control unit 1001 to output the moving image data. The communication control unit 1001 controls the external IFs 1002 and 1003 so as to output the moving image data therefrom (S1101).

In this state, the control unit 112 discriminates whether or not the recording start instruction is issued from the operation unit 113 (S1102). If the recording start instruction is issued, the control unit 112 determines the frame in which the recording is started. The control unit 112 instructs the output control unit 114 to output the command data for instructing the recording start and the information of the time code (recording start position) corresponding to the frame in which the recording is started (S1103). The output control unit 114 outputs the command data for instructing the recording start and the information of the frame (recording start position) to be subjected to execution of the command, to the external recording apparatus 1100 from the external IF 1002 or 1003. In the embodiment, the control unit 112 determines a frame which is later by a predetermined number of frames as a recording start position on the basis of a value of the time code added to the frame of the moving image data which is output at a point of time when the recording start instruction is received. The information of the time code serving as a recording start position is output to the external recording apparatus 1100 from the recording apparatus 1000. In the external recording apparatus 1100, the recording of the moving image data is started from the frame corresponding to the time code shown by the information of the recording start position in accordance with the recording start command as will be described hereinafter.

Subsequently, the control unit 112 discriminates whether or not the mode for recording the editing moving image data is set (S1104). By operating the operation unit 113, the user can set whether or not, in the external output mode, the editing moving image data is generated concurrently with the outputting of the moving image to the external recording apparatus and recorded. If the mode in which the editing moving image data is not recorded is set by the user, the control unit 112 controls so as not to record the editing moving image data. The control unit 112 discriminates whether or not the recording stop request is received from the external recording apparatus 1100 by the communication control unit 1001 (S1105).

In the embodiment, as will be described hereinafter, in the external recording apparatus 1100, if the remaining recording capacity of the recording medium is less than the threshold value and, further, the relay recording cannot be performed either, the external recording apparatus 1100 transmits the recording stop request. When the recording stop request is received, the control unit 112 determines the frame which is later by the predetermined number of frames as a recording stop position on the basis of the value of the time code added to the moving image data which is output at this point of time. The control unit 112 instructs the communication control unit 1001 to output the command data showing the recording stop and the information of the recording stop position (time code) to the external recording apparatus 1100. The communication control unit 1001 transmits the command data showing the recording stop and the information of the recording stop position to the external recording apparatus 1100 from the external IF 1102 or 1103 (S1109). In the external recording apparatus 1100, as will be described hereinafter, when the recording stop command and the information of the recording stop position are received, the data up to the frame designated by the information of the recording stop position is recorded, and thereafter, the recording of the moving image data is stopped.

If the recording stop request is not received, the control unit 112 discriminates whether or not the file division request is received from the external recording apparatus 1100 by the communication control unit 1001 (S1106). In the embodiment, as will be described hereinafter, when the external recording apparatus 1100 performs the relay recording, the file division request is transmitted in accordance with the switching of the recording medium. If the file division request is received, the control unit 112 determines the frame which is later by the predetermined number of frames as a recording stop position on the basis of the value of the time code added to the moving image data which is output at this point of time. The control unit 112 instructs the communication control unit 1001 to transmit the command data showing the file division and the information of the dividing position (time code) to the external recording apparatus 1100. The communication control unit 1001 transmits the command data showing the file division and the information of the file dividing position to the external recording apparatus 1100 from the external IF 1002 or 1003 (S1107).

If the file division request is not received, the control unit 112 discriminates whether or not the recording stop instruction is issued from the operation unit 113 (S1108). If the recording stop instruction is not issued, the moving image data is output as it is. If the recording stop instruction is issued, the control unit 112 determines the frame which is later by the predetermined number of frames, as a recording stop position on the basis of the value of the time code added to the moving image data which is output at that point of time. The control unit 112 instructs the communication control unit 1001 to transmit the command data showing the recording stop and the information of the recording stop position (time code) to the external recording apparatus 1100. The communication control unit 1001 transmits the command data showing the recording stop and the information of the recording stop position to the external recording apparatus 1100 from the external IF 1102 or 1103 (S1109).

If the mode for recording the editing moving image data is set, the control unit 112 discriminates whether or not the moving image data can be recorded into the recording mediums 108 and 109 (S1110). If none of the recording mediums are loaded or if the remaining recording capacities of the recording mediums are empty, the control unit 112 determines that the editing moving image data cannot be recorded. The control unit 112 controls so as not to record the editing moving image data. The processing routine advances to S1105 and the foregoing processings are executed.

If the editing moving image data can be recorded into at least one of the recording mediums, the control unit 112 controls the moving image processing unit 104 so as to generate editing moving image data. The control unit 112 instructs the recording medium control unit 105 to record the editing moving image data (S1111). If the moving image data can be recorded into both of the two recording mediums 108 and 109, the control unit 112 selects the recording medium having the larger remaining recording capacity and instructs the recording medium control unit 105 to record the editing moving image data into the selected recording medium. The recording medium control unit 105 generates a moving image file into the recording medium designated by the control unit 112 in order to record the editing moving image data and instructs the write and read units 106 and 107 to store the editing moving image data into the moving image file and record.

After the recording of the editing moving image data is started, the control unit 112 discriminates whether or not the recording stop instruction is issued (S1112). If the recording stop instruction is issued, the control unit 112 instructs the communication control unit 1001 to transmit the command data showing the recording stop and the information of the recording stop position (time code) to the external recording apparatus 1100. The communication control unit 1001 transmits the command data showing the recording stop and the information of the recording stop position to the external recording apparatus 1100 from the external IF 1102 or 1103 (S1113). The control unit 112 stops the creation of the editing moving image data which is executed by the moving image processing unit 104 and stops the recording (S1114).

If the recording stop instruction is not issued, the control unit 112 discriminates whether or not the recording stop request is received from the external recording apparatus 1100 by the communication control unit 1001 (S1115). If the recording stop request is received, the control unit 112 instructs the communication control unit 1001 to transmit the command data showing the recording stop and the information of the recording stop position to the external recording apparatus 1100. The communication control unit 1001 transmits the command data showing the recording stop and the information of the recording stop position to the external recording apparatus 1100 from the external IF 1102 or 1103 (S1113). The control unit 112 stops the creation of the editing moving image data which is executed by the moving image processing unit 104 and stops the recording (S1114).

If the recording stop request is not received, on the basis of the information of the remaining recording capacity from the recording medium control unit 105, the control unit 112 discriminates whether or not the remaining recording capacity of the recording medium in which the editing moving image data is being recorded is less than the predetermined threshold value (S1116). In the embodiment, it is determined that when the remaining recording capacity is less than the threshold value, the remaining recording capacity of the recording medium becomes empty. If the remaining recording capacity of the recording medium is less than the threshold value, the control unit 112 determines the frame which is later by the predetermined number of frames as a file dividing position on the basis of the value of the time code added to the moving image data which is output at this point of time. The control unit 112 instructs the communication control unit 1001 to transmit the command data showing the file division and the information of the file dividing position to the external recording apparatus 1100. The communication control unit 1001 transmits the command data showing the file division and the information of the file dividing position to the external recording apparatus 1100 from the external IF 1102 or 1103 (S1117). In the external recording apparatus 1100, when the command data of the file division and the information of the file dividing position are received, the data up to the frame of the designated file dividing position is stored into one moving image file, a new moving image file is generated from the next frame, and is recorded.

The control unit 112 closes the moving image file which is being currently recorded (S1118). At this time, after the data up to the frame of the same position as the dividing position instructed in S1117 is stored into one moving image file, the control unit 112 closes the file. The control unit 112 discriminates whether or not the editing moving image data can be recorded into the recording medium other than the recording medium which is selected currently (S1119).

If the moving image data cannot be recorded into the other recording medium, the control unit 112 stops the subsequent creation and recording of the editing moving image data (S1130). The processing routine advances to S1105 and the foregoing processings are executed. In this case, a message showing that although the mode for recording the editing moving image data is set, the editing moving image data cannot be recorded may be displayed to the display unit 111 by the control unit 112.

If the editing moving image data can be recorded into the other recording medium, the control unit 112 instructs the recording medium control unit 105 so as to newly generate a moving image file into the other recording medium and record the moving image data (S1120). The recording medium control unit 105 generates a moving image file into the recording medium designated by the control unit 112 in order to record the editing moving image data and instructs the write and read units 106 and 107 to store the moving image data into the moving image file and record.

Subsequently, the control unit 112 discriminates whether or not the recording stop instruction is issued (S1121). If the recording stop instruction is not issued, the control unit 112 discriminates whether or not the recording stop request is received from the external recording apparatus 1100 by the communication control unit 1001 (S1122). If the recording stop request is not received, the control unit 112 discriminates whether or not the remaining recording capacity of the recording medium in which the moving image data is being recorded is less than a predetermined threshold value (S1123).

If the remaining recording capacity of the recording medium is equal to or larger than the threshold value, on the basis of the information of the size of the recorded moving image file which is obtained from the recording medium control unit 105, the control unit 112 discriminates whether or not the size of moving image file exceeds a predetermined value (S1124). In the embodiment, as mentioned above, the moving image data recorded in the recording mediums 108 and 109 is managed in accordance with a predetermined file system. Therefore, when the size of editing moving image file which is being recorded reaches an upper limit value of the file size specified by the file system, the moving image file which is being recorded is temporarily closed, a moving image file is newly generated, and the recording is continued. Therefore, in the embodiment, a value which is smaller than the upper limit value of the file size specified by the file system by a predetermined amount is set as a predetermined value. When the size of moving image file which is being recorded exceeds the predetermined value, the file dividing processing is executed (S1126).

Figure 12:
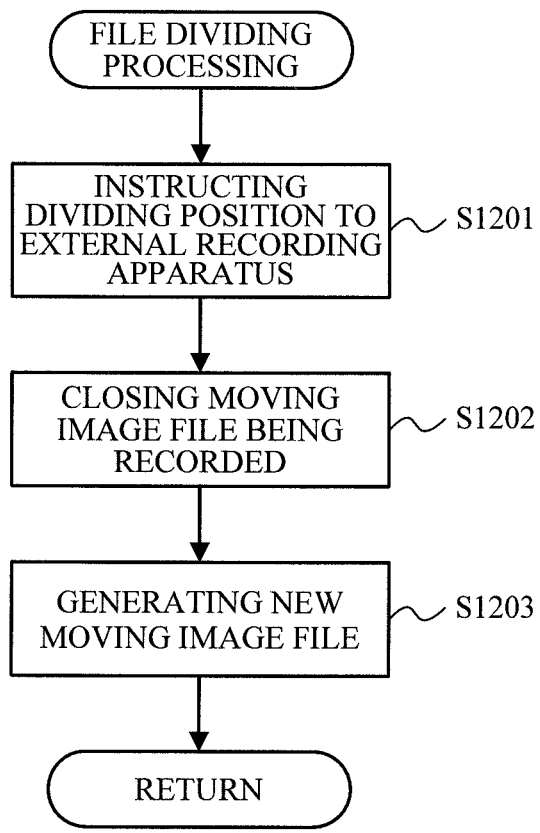
FIG. 12 is a flowchart for the operation of the recording apparatus according to the third embodiment of the invention.

FIG. 12 is a flowchart showing the file dividing operation. When the file division request is received, the control unit 112 determines the frame which is later by the predetermined number of frames as a file dividing position on the basis of the value of the time code added to the moving image data which is output at this point of time. The control unit 112 instructs the communication control unit 1001 to transmit the command data showing the file division and the information of the file dividing position (time code) to the external recording apparatus 1100. The communication control unit 1001 transmits the command data showing the file division and the information of the file dividing position to the external recording apparatus 1100 from the external IF 1102 or 1103 (S1201). Subsequently, the control unit 112 instructs the recording medium control unit 105 to close the editing moving image data which is being recorded (S1202). The recording medium control unit 105 instructs the write and read units 106 and 107 to close the moving image file which is being currently recorded. At this time, after the frames up to the frame at the same position as the dividing position instructed in S1201 were stored into one moving image file, the control unit 112 closes the file. Subsequently, the control unit 112 instructs the recording medium control unit 105 to newly generate a moving image file and record the editing moving image data into the moving image file (S1203). The recording medium control unit 105 instructs the write and read units 106 and 107 to newly generate a moving image file to store therein the editing moving image data and record this moving image file.

If the size of moving image file which is being recorded is equal to or less than the predetermined value in S1124, the control unit 112 discriminates whether or not the communication control unit 1001 receives the file division request from the external recording apparatus 1100 (S1125). If the file division request is received, the control unit 112 executes the file dividing processing in FIG. 12. If the file division request is not received, the recording is continued as it is.

If the recording stop instruction is received in S1121, if the recording stop request is received in S1122, or if the remaining recording capacity is less than the threshold value in S1123, the control unit 112 instructs the external recording apparatus 1100 to stop the recording of the moving image data. That is, the control unit 112 instructs the communication control unit 1001 to transmit the command data showing the recording stop and the information of the recording stop position to the external recording apparatus 1100. The communication control unit 1001 transmits the command data showing the recording stop and the information of the recording stop position to the external recording apparatus 1100 from the external IF 1102 or 1103 (S1113). The control unit 112 stops the creation of the editing moving image data which is executed by the moving image processing unit 104 and stops the recording (S1114).

If the remaining recording capacity is equal to or larger than the threshold value in S1116, the control unit 112 discriminates whether or not the size of the editing moving image file which is being recorded exceeds the predetermined value (S1127). If the size of the editing moving image file exceeds the predetermined value, the control unit 112 executes the file dividing processing in FIG. 12 (S1129). If the size of the moving image file which is being recorded is equal to or less than the predetermined value, the control unit 112 discriminates whether or not the communication control unit 1001 receives the file division request from the external recording apparatus 1100 (S1128). If the file division request is received, the control unit 112 executes the file dividing processing in FIG. 12. If the file division request is not received, the recording is continued as it is.

Subsequently, the processing of the external recording apparatus 1100 will be described. In the external recording apparatus 1100 in FIG. 10B, when the recording start command and the information of the recording start position are received in a state where the moving image data is input from the external IF 102, the communication control unit 1101 outputs them to the control unit 211. The control unit 211 selects one of the recording mediums 1106 and 1107. The control unit 211 instructs the recording medium control unit 1103 to generate a moving image file into the selected recording medium and start the recording from the frame at the designated recording start position. The recording medium control unit 1103 instructs the write and read unit 1104 or 1105 to generate a moving image file and start the recording.

After the recording is started, the control unit 211 confirms the remaining recording capacity of the recording medium in which the moving image file is being recorded. When the remaining recording capacity is less than the threshold value, the control unit 211 discriminates whether or not the relay recording can be performed. If the remaining recording capacity of the other recording medium still remains and the relay recording can be performed, the control unit 211 instructs the communication control unit 1101 so as to output the file division request. The communication control unit 1101 outputs the file division request to the recording apparatus 1000 by the external IF 1102. In response to the file division request, when the command of the file division and the information of the file dividing position are transmitted from the recording apparatus 1000, the communication control unit 1101 transmits the command of the file division and the information of the file dividing position to the control unit 211. The control unit 211 instructs the recording medium control unit 1103 so as to close the moving image file at the designated file dividing position. The recording medium control unit 1103 stores the moving image data up to the designated position into the moving image file which is being currently recorded and, thereafter, closes the file. The recording medium control unit 1103 newly generates a moving image file into the other recording medium and continues the recording.

When the relay recording cannot be performed, the control unit 211 instructs the communication control unit 1101 to output the recording stop request. The communication control unit 1101 outputs the recording stop request to the recording apparatus 1000 by the external IF 1102. In response to the recording stop request, as mentioned above, when the command of the recording stop and the information of the stop position are transmitted from the recording apparatus 1000, the communication control unit 1101 transmits the recording stop command and the information of the stop position to the control unit 211. The control unit 211 instructs the recording medium control unit 1103 to close the moving image file at the designated stop position. The recording medium control unit 1103 stores the moving image data up to the designated position into the moving image file which is being recorded at present and, thereafter, closes the file.

After the recording is started, when the command of the file division and the information of the file dividing position are transmitted from the recording apparatus 1000, the communication control unit 1101 transmits the command of the file division and the information of the file dividing position to the control unit 211. The control unit 211 instructs the recording medium control unit 1103 to close the moving image file at the designated file dividing position. The recording medium control unit 1103 stores the moving image data up to the designated position into the moving image file which is being currently recorded and, thereafter, closes the file. The recording medium control unit 1103 newly generates a moving image file and continues the recording.

After the recording is started, when the recording stop command and the information of the stop position are transmitted from the recording apparatus 1000, the communication control unit 1101 transmits the recording stop command and the information of the stop position to the control unit 211. The control unit 211 instructs the recording medium control unit 1103 to close the moving image file at the designated stop position. The recording medium control unit 1103 stores the moving image data up to the designated position into the moving image file which is being currently recorded and, thereafter, closes the file.

As mentioned above, in the embodiment, in the case of outputting the moving image data to the external recording medium or the like in the external output mode, the editing moving image data is generated concurrently with the outputting of the moving image data and is recorded into the recording medium. Therefore, there is no need to generate the editing moving image data later. In the embodiment, when the moving image file of the editing moving image data is closed, the external recording apparatus is instructed to divide the moving image file. Further, in the embodiment, when the external recording apparatus transmits the file division request at the time of the relay recording, the editing moving image file is divided. Therefore, the editing moving image data recorded in the recording medium and the moving image data recorded in the external recording apparatus can be easily associated with each other.

Subsequently, the fourth embodiment of the invention will be described. Also in the fourth embodiment, constructions of the recording apparatus 1000 and the external recording apparatus 1100 are similar to those in the third embodiment.

Figure 13B:
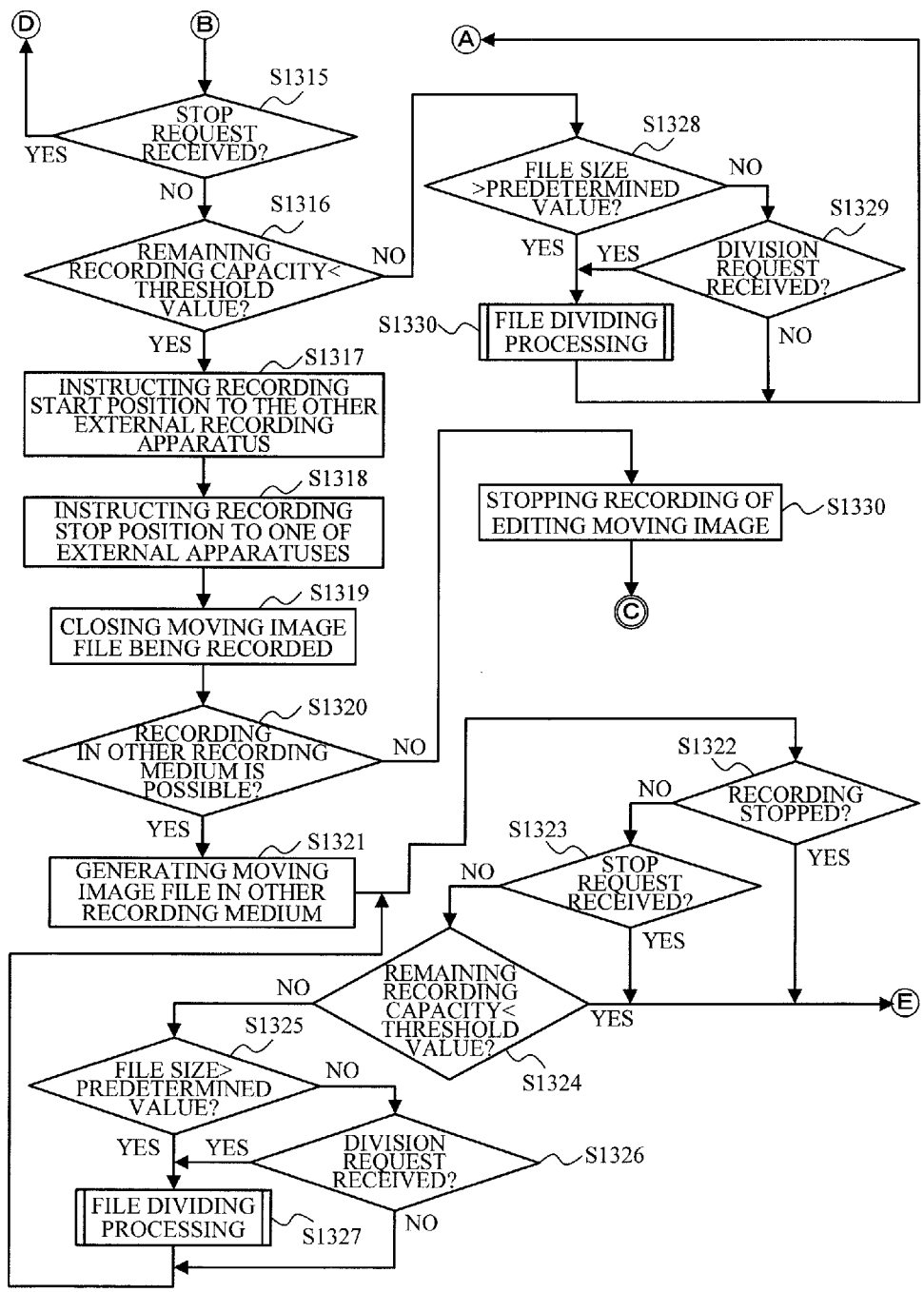
FIG. 13 is comprised of FIGS. 13A and 13B showing flowchart for the operation of a recording apparatus according to the fourth embodiment of the invention.

FIGS. 13A and 13B are flowcharts for the operation of the recording apparatus 1000 regarding the external output mode according to the embodiment. Processings in FIGS. 13A and 13B are executed in accordance with the control unit 112 controlling each unit of the recording apparatus 1000.

Figure 6E:
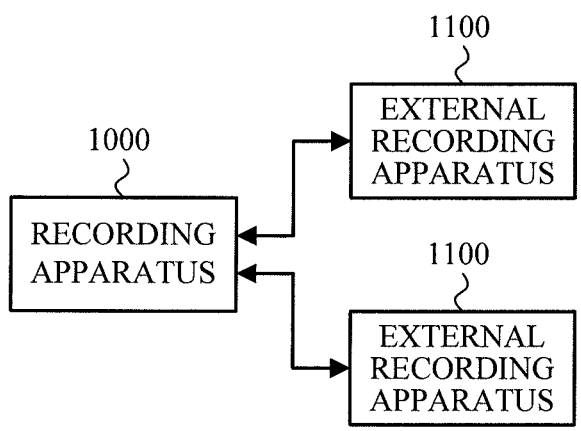

In the embodiment, a system is constructed in such a manner that the recording apparatus 1000 and the two external recording apparatuses 1100 are connected by cables which conform with DisplayPort as illustrated in FIG. 6E and the moving image data is recorded.

As illustrated in FIG. 6E, when the system is set into the external output mode by the user in a state where the recording apparatus 1000 and the two external recording apparatuses 1100 are connected, the control unit 112 outputs the moving image data from the external IFs 1002 and 1003 (S1301). In this state, the control unit 112 discriminates whether or not the recording start instruction is issued from the operation unit 113 (S1302). In the embodiment, the user selects one of the two external recording apparatuses 1100 and instructs the selected external recording apparatus to record the moving image data. When the recording start instruction is issued, the control unit 112 decides a frame in which the recording is started. The control unit 112 instructs the communication control unit 1001 to output the command data for instructing the recording start and the information of the time code (recording start position) corresponding to the frame in which the recording is started to the selected recording apparatus 1100 (S1303). The communication control unit 1001 outputs the recording start command data and the information of the recording start position to the external recording apparatus 1100 from the external IF 1002 or 1003. In the embodiment, the control unit 112 determines the frame which is later by the predetermined number of frames as a recording start position on the basis of the value of the time code added to the frame of the moving image data which is output at a point of time when the recording start instruction is received. The information of the time code serving as a recording start position is output to the external recording apparatus 1100 from the recording apparatus 1000.

Subsequently, the control unit 112 discriminates whether or not the mode for recording the editing moving image data is set (S1304). If the mode in which the editing moving image data is not recorded is set by the user, the control unit 112 controls so as not to record the editing moving image data. The control unit 112 discriminates whether or not the recording stop request is received from the external recording apparatus 1100 by the communication control unit 1001 (S1305).

If the recording stop request is received, the control unit 112 determines the frame which is later by the predetermined number of frames as a recording stop position on the basis of the value of the time code added to the moving image data which is output at this point of time. The control unit 112 instructs the communication control unit 1001 to output the command data showing the recording stop and the information of the recording stop position (time code) to the external recording apparatus 1100. The communication control unit 1001 transmits the command data showing the recording stop and the information of the recording stop position to the external recording apparatus 1100 from the external IF 1102 or 1103 (S1309).

If the recording stop request is not received, the control unit 112 discriminates whether or not the file division request is received from the external recording apparatus 1100 by the communication control unit 1001 (S1306). If the file division request is received, the control unit 112 determines the frame which is later by the predetermined number of frames, as a recording stop position on the basis of the value of the time code added to the moving image data which is output at this point of time. The control unit 112 instructs the communication control unit 1001 to transmit the command data showing the file division and the information of the dividing position (time code) to the external recording apparatus 1100. The communication control unit 1001 transmits the command data showing the file division and the information of the file dividing position to the external recording apparatus 1100 from the external IF 1002 or 1003 (S1307).

If the file division request is not received, the control unit 112 discriminates whether or not the recording stop instruction is issued from the operation unit 113 (S1308). If the recording stop instruction is not issued, the moving image data is output as it is. If the recording stop instruction is issued, the control unit 112 determines the frame which is later by the predetermined number of frames, as a recording stop position on the basis of the value of the time code added to the moving image data which is output at that point of time. The control unit 112 instructs the communication control unit

1001 to transmit the command data showing the recording stop and the information of the recording stop position (time code) to the external recording apparatus 1100. The communication control unit 1001 transmits the command data showing the recording stop and the information of the recording stop position to the external recording apparatus 1100 from the external IF 1102 or 1103 (S1309).

If the mode for recording the editing moving image data is set, the control unit 112 discriminates whether or not the moving image data can be recorded into the recording mediums 108 and 109 (S1310). If none of the recording mediums are loaded or if the remaining recording capacities of the recording mediums are empty, the control unit 112 determines that the editing moving image data cannot be recorded. The control unit 112 controls so as not to record the editing moving image data. The processing routine advances to S1305 and the foregoing processings are executed.

If the editing moving image data can be recorded into at least one of the recording mediums, the control unit 112 controls the moving image processing unit 104 so as to generate editing moving image data. The control unit 112 instructs the recording medium control unit 105 to record the editing moving image data (S1311). The recording medium control unit 105 generates a moving image file into the recording medium designated by the control unit 112 in order to record the editing moving image data and instructs the write and read units 106 and 107 to store the editing moving image data into the moving image file and record.

As mentioned above, after the recording of the editing moving image data is started, the control unit 112 discriminates whether or not the recording stop instruction is issued (S1312). If the recording stop instruction is issued, the control unit 112 instructs the communication control unit 1001 to transmit the command data showing the recording stop and the information of the recording stop position (time code) to the external recording apparatus 1100. The communication control unit 1001 transmits the command data showing the recording stop and the information of the recording stop position to the external recording apparatus 1100 from the external IF 1102 or 1103 (S1313). The control unit 112 stops the creation of the editing moving image data which is executed by the moving image processing unit 104 and stops the recording (S1314).

If the recording stop instruction is not issued, the control unit 112 discriminates whether or not the recording stop request is received from the external recording apparatus 1100 by the communication control unit 1001 (S1315). If the recording stop request is received, the control unit 112 instructs the communication control unit 1001 to transmit the command data showing the recording stop and the information of the recording stop position to the external recording apparatus 1100. The communication control unit 1001 transmits the command data showing the recording stop and the information of the recording stop position to the external recording apparatus 1100 from the external IF 1102 or 1103 (S1313). The control unit 112 stops the creation of the editing moving image data which is executed by the moving image processing unit 104 and stops the recording (S1314).

If the recording stop instruction is not received, on the basis of the information of the remaining recording capacity from the recording medium control unit 105, the control unit 112 discriminates whether or not the remaining recording capacity of the recording medium in which the editing moving image data is being recorded is less than the predetermined threshold value (S1316). In the embodiment, it is determined that when the remaining recording capacity is less than the predetermined threshold value, the remaining recording capacity of the recording medium becomes empty. If the remaining recording capacity of the recording medium is less than the threshold value, the control unit 112 determines the frame which is later by the predetermined number of frames as a file dividing position on the basis of the value of the time code added to the moving image data which is output at this point of time. The next frame of such a frame is decided as a recording start position. The control unit 112 instructs the communication control unit 1001 to transmit the command data showing the recording start and the information of the recording start position to the other recording apparatus 1100 in which the moving image is not currently recorded (S1317). The control unit 112 instructs the communication control unit 1001 to output the command data showing the recording stop and the information of the recording stop position to the recording apparatus 1100 in which the moving image data is being currently recorded (S1318). The communication control unit 1001 outputs the recording stop command and the information of the recording stop position to the recording apparatus 1100 in which the moving image data is being recorded from the external IF 1102 or 1103 and outputs the recording start command and the information of the recording start position to the other recording apparatus 1100.

Subsequently, the control unit 112 closes the moving image file which is being currently recorded (S1319). At this time, after the data up to the frame of the same position as the recording stop position instructed in S1318 is stored into one moving image file, the control unit 112 closes the file. The control unit 112 discriminates whether or not the moving image data can be recorded into the recording medium other than the recording medium which is selected currently (S1320). If the moving image data cannot be recorded into the other recording medium, the control unit 112 stops the subsequent creation and recording of the editing moving image data. The processing routine advances to S1305 and the foregoing processings are executed. In this case, a message showing that although the mode for recording the editing moving image data is set, the editing moving image data cannot be recorded may be displayed to the display unit 111 by the control unit 112.

If the editing moving image data can be recorded into the other recording medium, the control unit 112 instructs the recording medium control unit 105 to newly generate a moving image file into the other recording medium and record the editing moving image data (S1321). The recording medium control unit 105 generates a moving image file into the recording medium designated by the control unit 112 in order to record the editing moving image data and instructs the write and read units 106 and 107 to store the moving image data into the moving image file and record.

Subsequently, the control unit 112 discriminates whether or not the recording stop instruction is issued (S1322). If the recording stop instruction is not issued, the control unit 112 discriminates whether or not the recording stop request is received from the external recording apparatus 1100 by the communication control unit 1001 (S1323). If the recording stop request is not received, the control unit 112 discriminates whether or not the remaining recording capacity of the recording medium in which the moving image data is being recorded is less than the predetermined threshold value (S1324). If the remaining recording capacity of the recording medium is equal to or larger than the threshold value, on the basis of the information of the size of the recorded moving image file which is obtained from the recording medium control unit 105, the control unit 112 discriminates whether or not the size of moving image file exceeds the predetermined value (S1325). If the size of moving image file which is being recorded exceeds the predetermined value, the file dividing processing in FIG. 12 is executed (S1327).

If the size of moving image file which is being recorded is equal to or less than the predetermined value, the control unit 112 discriminates whether or not the communication control unit 1101 receives the file division request from the external recording apparatus 1100 (S1326). If the file division request is received, the control unit 112 executes the file dividing processing in FIG. 12. If the file division request is not received, the recording is continued as it is.

If the recording stop instruction is received in S1322, if the recording stop request is received in S1323, or if the remaining recording capacity is less than the threshold value in S1324, the control unit 112 stops the recording of the moving image data which is executed by the external recording apparatus. That is, the control unit 112 instructs the communication control unit 1001 to transmit the command data showing the recording stop and the information of the recording stop position to the external recording apparatus 1100. The communication control unit 1001 transmits the command data showing the recording stop and the information of the recording stop position to the external recording apparatus 1100 from the external IF 1102 or 1103 (S1313). The control unit 112 stops the creation of the editing moving image data which is executed by the moving image processing unit 104 and stops the recording (S1314).

If the remaining recording capacity is equal to or larger than the threshold value in S1316, the control unit 112 discriminates whether or not the size of the editing moving image file which is being recorded exceeds the predetermined value (S1328). If the size of the editing moving image file exceeds the predetermined value, the control unit 112 executes the file dividing processing in FIG. 12 (S1330). If the size of the moving image file which is being recorded is equal to or less than the predetermined value, the control unit 112 discriminates whether or not the communication control unit 1001 receives the file division request from the external recording apparatus 1100 (S1329). If the file division request is received, the control unit 112 executes the file dividing processing in FIG. 12. If the file division request is not received, the recording is continued as it is.

The external recording apparatus 1100 operates in a manner similar to the third embodiment and records the moving image data which is input into the recording mediums 1106 and 1107.

Technological advantages similar to those in the third embodiment are also obtained by the fourth embodiment. That is, in the case where the moving image data is output to the external recording apparatus or the like in the external output mode, the editing moving image data is generated concurrently with the outputting of the moving image data and recorded into the recording medium. Therefore, there is no need to generate the editing moving image data later. In the fourth embodiment, when the moving image file of the editing moving image data is closed, switching of the external recording apparatus to record the moving image data is instructed. Further, in the embodiment, in the case where the external recording apparatus transmits the file division request at the time of the relay recording, the editing moving image file is divided. Therefore, the editing moving image data recorded in the recording medium and the moving image data recorded in the external recording apparatus can be easily associated with.

Although the embodiment is described with respect to the example in which the invention is applied to the image pickup apparatus, the invention is not limited to such an example. For instance, the invention may be applied to an information processing apparatus such as a personal computer or the like having an input/output unit, a display unit, and a recording unit or to a recording system in which such an information processing apparatus and an external recording apparatus such as a server or the like are connected.

Each unit constructing the recording apparatus and each step of the control method according to the embodiments of the invention mentioned above can be realized by a method whereby a program stored in a RAM, ROM, or the like of a computer operates. The program and a computer-readable storage medium in which the program is stored are incorporated in the invention.

The invention can be also embodied, for example, as a system, an apparatus, a method, a program, a storage medium, or the like. Specifically speaking, the invention can be applied to a system constructed by a plurality of apparatuses or an apparatus constructed by one equipment.

The invention also incorporates a case where the program of software for realizing the functions of the embodiments mentioned above is supplied to the system or apparatus directly or from a remote place. The invention also incorporates a case where those functions are accomplished by a method whereby a computer of the system or apparatus reads out and executes a program code of the supplied program.

Therefore, the program code itself which is installed into the computer in order to realize the functions and processings of the invention also realizes the invention. That is, the invention also incorporates the computer program itself for realizing the functions and processings of the invention. In such a case, the computer program may have any form such as object code, program which is executed by an interpreter, script data which is supplied to the OS, or the like so long as it has a function of the program.

As storage media for supplying the program, for example, there are a flexible disk, a hard disk, an optical disk, a magnetooptic disk, and the like. Further, there are an MO, a CD-ROM, a CD-R, a CD-RW, a magnetic tape, a non-volatile memory card, a ROM, a DVD (DVD-ROM, DVD-R), and the like.

As another program supplying method, there is a method of connecting a client computer to a Homepage of the Internet by using a browser of the client computer. The computer program itself of the invention can be also supplied from the Homepage or the program can be also supplied by downloading a compressed file including an automatic installing function into a storage medium such as a hard disk or the like.

The functions and processings of the invention can be also realized by a method whereby the program code constructing the program of the invention is divided into a plurality of files and those files are downloaded from different Homepages. That is, a WWW server for allowing a plurality of users to download a program file for realizing the functions and processings of the invention by the computer is also incorporated in the invention.

As another method, the functions and processings of the invention can be also realized by a method whereby the program of the invention is encrypted, stored into a storage medium such as a CD-ROM or the like, and distributed to the users, the user who can clear a predetermined condition is allowed to download key information for decrypting the encryption from the Homepage through the Internet, the encrypted program is executed by using the key information, the program is installed into the computer, and those functions are realized.

The functions of the embodiments mentioned above can be realized by a method whereby the computer executes the read-out program. Further, the functions of the embodiments mentioned above can be realized by a method whereby the OS or the like which operates on the computer executes a part or all of actual processings on the basis of instructions of the program, and they are realized by those processings.

As further another method, the functions of the embodiments mentioned above can be realized by a method whereby, first, the program read out of the storage medium is written into a memory provided for a function expanding board inserted in a computer or a function expanding unit connected to the computer, a CPU or the like provided for the function expanding board or the function expanding unit executes a part or all of actual processings on the basis of instructions of the program, and they are realized by those processings.

The foregoing embodiments have merely been shown and described as specific examples for embodying the invention and the technical scope of the invention should not be limitedly interpreted. That is, the invention can be embodied in various forms without departing from a technical idea of the invention or a principal features thereof.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-025372 filed on Feb. 8, 2012, which is hereby incorporated by reference herein in its entirety.

What is claimed is:

1. A recording apparatus comprising:
    an obtaining unit configured to obtain moving image data;
    a generating unit configured to generate first moving image data and second moving image data by using the moving image data obtained by the obtaining unit;
    an outputting unit configured to output moving image data to an external apparatus, wherein the external apparatus records a moving image file including the moving image data output from the outputting unit;
    a recording unit configured to record a moving image file including moving image data generated by the generating unit into a recording medium; and
    a control unit configured to, in the case that the first moving image data is outputted from the outputting unit to the external apparatus for recording a first moving image file including the first moving image data, control the generating unit so as to generate the second moving image data in parallel with the outputting of the first moving image data and control the recording unit to record a second moving image file including the generated second moving image data into the recording medium,
    wherein the control unit controls the outputting unit to output a file close instruction for closing a moving image file to the external apparatus in accordance with the close of the second moving image file including the second moving image data which is being recorded into the recording medium,
    wherein the external apparatus closes the first moving image file in accordance with the file close instruction which is outputted from the outputting unit in accordance with the close of the second moving image file, and continues recording the first moving image data by generating a third moving image file including the first moving image data.

2. An apparatus according to claim 1, wherein in accordance with a remaining recording capacity of the recording medium being less than a threshold value during recording the second moving image file, the control unit controls the recording unit to stop recording the second moving image data on the recording medium and to close the second moving image file.

3. An apparatus according to claim 1, wherein in accordance with a file size of the second moving image file exceeding a predetermined size, the control unit controls the recording unit to close the second moving image file, and to continue recording the second moving image data on the recording medium by generating a fourth moving image file including the second moving image data.

4. An apparatus according to claim 1, wherein the recording unit records the moving image data into a plurality of recording mediums including a first recording medium and a second recording medium, and wherein the control unit controls the recording unit, in accordance with a remaining recording capacity of the first recording medium into which the second moving image file is being recorded is decreased to a predetermined value, to close the second image file, and to continue recording the second moving image data on the second recording medium by generating a fourth moving image file including the second moving image data on the second recording medium.

5. An apparatus according to claim 1, wherein the outputting unit multiplexes an instruction for closing the moving image file including the first moving image data to the first moving image data which is output to the external apparatus.

6. An apparatus according to claim 1, wherein the second moving image data has less number of pixels than that of the first moving image data.

7. A recording apparatus comprising:
    an obtaining unit configured to obtain moving image data;
    a generating unit configured to generate first moving image data and second moving image data by using the moving image data obtained by the obtaining unit;
    an outputting unit configured to output moving image data to an external apparatus, wherein the external apparatus records a moving image file including the moving image data output from the outputting unit;
    a recording unit configured to record a moving image file including moving image data generated by the generating unit into a recording medium; and
    a control unit configured to, in the case that the first moving image data is outputted from the outputting unit to the external apparatus for recording a first moving image file including the first moving image data, control the generating unit so as to generate the second moving image data in parallel with the outputting of the first moving image data and control the recording unit to record a second moving image file including the generated second moving image data into the recording medium,
    wherein the control unit controls the recording unit so as to close the second moving image file which is being recorded into the recording medium and to continue recording the second moving image data on the recording medium by generating a third moving image file including the second moving image data, and controls the outputting unit to output an instruction for closing a moving image file to the external apparatus in accordance with the close of the second moving image file.

8. An apparatus according to claim 7, wherein the second moving image data has less number of pixels than that of the first moving image data.

9. A recording apparatus comprising:
    an obtaining unit configured to obtain moving image data;
    a generating unit configured to generate first moving image data and second moving image data by using the moving image data obtained by the obtaining unit;

an outputting unit configured to output moving image data to an external apparatus, wherein the external apparatus records a moving image file including the moving image data output from the outputting unit;

a recording unit configured to record a moving image file including moving image data generated by the generating unit into one of a first recording medium and a second recording medium; and a control unit configured to, in the case that the first moving image data is outputted from the outputting unit to the external apparatus for recording a first moving image file including the first moving image data, control the generating unit so as to generate the second moving image data in parallel with the outputting of the first moving image data and control the recording unit to record a second moving image file including the generated second moving image data into the first recording medium, wherein, in accordance with a remaining capacity of the first recording medium decreased to a threshold during recording the second moving image file, the control unit (a) controls the recording unit to close the second moving image file which is being recorded into the first recording medium and to continue recording the second moving image data into the second recording medium by generating a third moving image file on the second recording medium, and (b) controls the outputting unit to output an instruction for closing a moving image.

10. An apparatus according to claim 9, wherein the second moving image data has less number of pixels than that of the first moving image data.

11. A recording method of a moving image, comprising the steps of:

obtaining moving image data;

generating first moving image data and second moving image data by using the moving image data obtained in the obtaining step;

outputting moving image data to an external apparatus, wherein the external apparatus records a moving image file including the moving image data output from the outputting unit;

recording a moving image file including moving image data generated in the generating step into a recording medium; and in the case that the first moving image data is outputted to the external apparatus for recording a first moving image file including the first moving image data, controlling the generating step so as to generate the second moving image data in parallel with the outputting of the first moving image data and controlling the recording step to record a second moving image file including the generated second moving image data into the recording medium, outputting a file close instruction for closing a moving image file to the external apparatus in accordance with the close of the second moving image file including the second moving image data which is being recorded into the recording medium, wherein the external apparatus closes the first moving image file in accordance with the file close instruction which is outputted in accordance with the close of the second moving image file, and continues recording the first moving image data by generating a third moving image file including the first moving image data.

12. A recording method of a moving image, comprising the steps of:

obtaining moving image data;

generating first moving image data and second moving image data by using the moving image data obtained in the obtaining step;

outputting moving image data to an external apparatus, wherein the external apparatus records a moving image file including the moving image data output by the outputting step;

recording a moving image file including moving image data generated by the generating unit into a recording medium; and in the case that the first moving image data is outputted to the external apparatus for recording a first moving image file including the first moving image data, controlling the generating step so as to generate the second moving image data in parallel with the outputting of the first moving image data and controlling the recording step to record a second moving image file including the generated second moving image data into the recording medium, wherein the recording step closes the second moving image file which is being recorded into the recording medium and continues recording the second moving image data on the recording medium by generating a third moving image file including the second moving image data;

outputting an instruction for closing a moving image file including the first moving image data to the external apparatus in accordance with the close of the second moving image file.

13. A recording method of a moving image, comprising the steps of:

obtaining moving image data;

generating first moving image data and second moving image data by using the moving image data obtained in the obtaining unit;

outputting moving image data to an external apparatus, wherein the external apparatus records a moving image file including the moving image data output by the outputting step;

recording a moving image file including moving image data generated by the generating step into one of a first recording medium and a second recording medium; and in the case that the first moving image data is outputted to the external apparatus for recording a first moving image file including the first moving image data, controlling the generating step so as to generate the second moving image data in parallel with the outputting of the first moving image data and controlling the recording unit to record a second moving image file including the generated second moving image data into the first recording medium, in accordance with a remaining capacity of the first recording medium decreased to a threshold during recording the second moving image file, controlling (a) the recording step to close the second moving image file which is being recorded into the first recording medium and to continue recording the second moving image data into the second recording medium by generating a third moving image file on the second recording medium, and (b) controlling the outputting step to output an instruction for closing a moving image file.

* * * * *